(12) United States Patent
Hyodo et al.

(10) Patent No.: US 8,780,109 B2
(45) Date of Patent: Jul. 15, 2014

(54) IMAGE PROCESSING APPARATUS, IMAGE PROCESSING METHOD AND AN IMAGE PROCESSING PROGRAM FOR REDUCING A FEELING OF DISCOMFORT AND DISPLEASURE WHEN PRESENTING A THREE-DIMENSIONAL IMAGE

(75) Inventors: Yasuhide Hyodo, Tokyo (JP); Shuichi Takahashi, Kanagawa (JP); Satoshi Shioiri, Miyagi (JP)

(73) Assignee: Sony Corporation (JP)

( * ) Notice: Subject to any disclaimer, the term of this patent is extended or adjusted under 35 U.S.C. 154(b) by 86 days.

(21) Appl. No.: 13/474,151

(22) Filed: May 17, 2012

(65) Prior Publication Data

US 2013/0127837 A1 May 23, 2013

(30) Foreign Application Priority Data

May 26, 2011 (JP) ................................. 2011-117649

(51) Int. Cl.
*G06T 15/00* (2011.01)
(52) U.S. Cl.
USPC ............................ 345/419; 345/420; 345/694
(58) Field of Classification Search
None
See application file for complete search history.

(56) References Cited

U.S. PATENT DOCUMENTS

| | | | |
|---|---|---|---|
| 6,198,484 B1* | 3/2001 | Kameyama | 345/419 |
| 6,515,659 B1* | 2/2003 | Kaye et al. | 345/419 |
| 8,044,997 B2* | 10/2011 | Masuda et al. | 348/51 |
| 8,334,867 B1* | 12/2012 | Davidson | 345/419 |
| 8,395,617 B2* | 3/2013 | Kao et al. | 345/419 |

FOREIGN PATENT DOCUMENTS

| | | |
|---|---|---|
| JP | 2001-238231 | 8/2001 |
| JP | 3749227 | 2/2006 |

* cited by examiner

*Primary Examiner* — Said Broome
(74) *Attorney, Agent, or Firm* — Sheridan Ross P.C.

(57) ABSTRACT

By adjusting parameters of single-eye 3D information on the basis of the visual-sense characteristic of a human being, it is possible to present a 3D image more hardly causing the human being to have a feeling of discomfort and a feeling of displeasure. An input-value-adjustment-quantity determination section determines an adjustment quantity of an input value on the basis of an evaluation function to serve as an adjustment quantity corresponding to a determined depth adjustment quantity. An adjustment-gain computation block computes a gain value of each of spatial-frequency components of an input 3D image on the basis of the adjustment quantity of the input value. An image adjustment block adjusts the spatial-frequency components in accordance with the gain values computed for the spatial-frequency components respectively. The present application can be applied to typically an image processing apparatus for adjusting depths of the input 3D image.

18 Claims, 15 Drawing Sheets

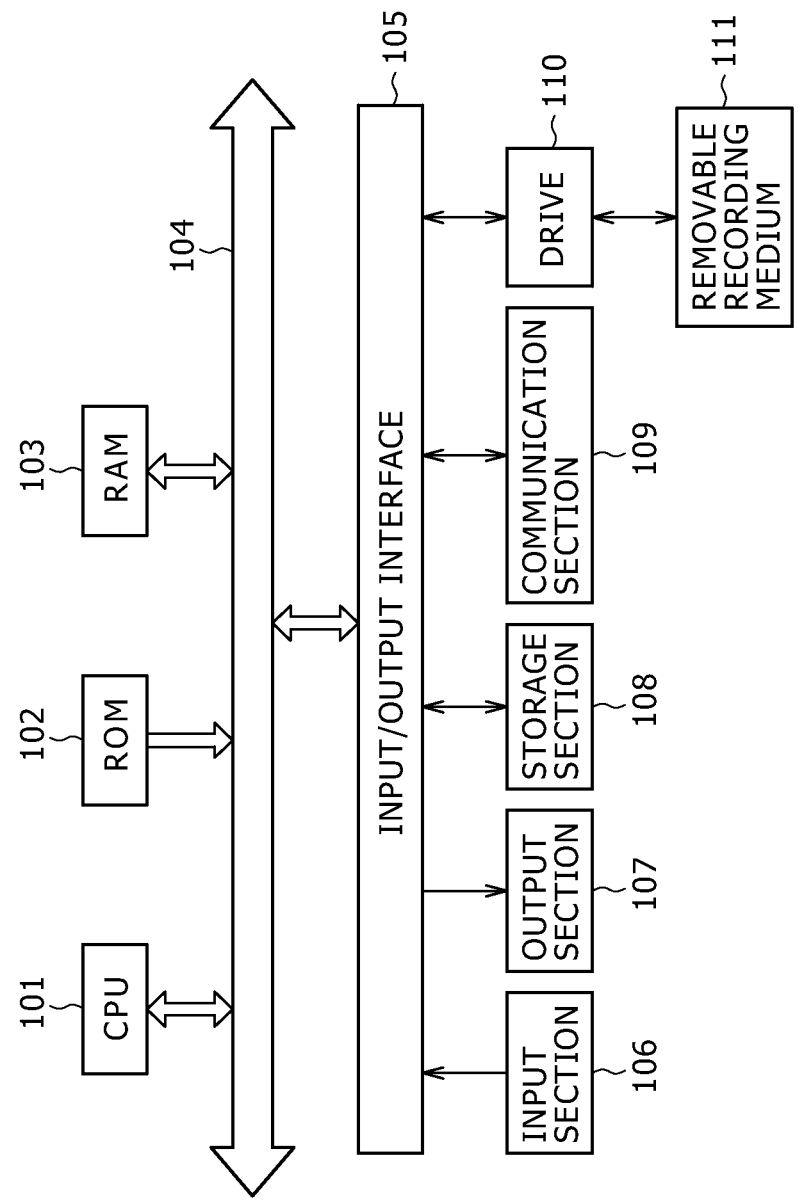

IMAGE PROCESSING APPARATUS, IMAGE PROCESSING METHOD AND AN IMAGE PROCESSING PROGRAM FOR REDUCING A FEELING OF DISCOMFORT AND DISPLEASURE WHEN PRESENTING A THREE-DIMENSIONAL IMAGE

CROSS REFERENCES TO RELATED APPLICATIONS

The present application claims priority to Japanese Priority Patent Application JP 2011-117649 filed in the Japan Patent Office on May 26, 2011, the entire content of which is hereby incorporated by reference.

BACKGROUND

In general, the present application relates to an image processing apparatus, an image processing method and an image processing program. More particularly, the present application relates to an image processing apparatus capable of presenting a 3D (three-dimensional) image more hardly causing a human being to have a feeling of discomfort and a feeling of displeasure by adjusting parameters of single-eye 3D information on the basis of the visual-sense characteristic of the human being, and relates to an image processing method adopted by the apparatus as well as an image processing program implementing the method.

As a method for displaying a 2D (two-dimensional) image on a 2D display screen and having the image viewer visually perceive the 2D image as a 3D image, there is provided a method for providing the left and right eyes of the image viewer with respectively a left-eye 2D image and a right-eye 2D image which have a binocular disparity, that is, a disparity between the left and right eyes.

Information used by a human being to visually perceive the spatial and depth effects of a viewed object includes binocular 3D information provided by the left and right eyes and single-eye 3D information provided by a single eye. A human being visually perceives the spatial and depth effects of a viewed object and/or a space by combining the binocular 3D information and the single-eye 3D information. The binocular 3D information typically includes a binocular disparity and a horizontal convergence whereas the single-eye 3D information typically includes shading, contrast, a color, a spatial frequency and a shielding relation.

When it is desired to emphasize the spatial and depth effects of a viewed object in the method for displaying a 2D image on a 2D display screen and having the image viewer visually perceive the 2D image as a 3D image, there is conceivably provided a typical technique for increasing the binocular disparity included in the binocular 3D information.

From the human eyeball structure point of view and from the human visual-sense characteristic point of view, however, the technique for increasing the binocular disparity has problems described as follows. In general, the eyeball of a human being is in a state of slight inward convergence in comparison with parallel lines so that, when the binocular disparity is made longer than the distance between the pupils, the eyes are put in a state of outward divergence. Since the distance between the pupils of a human being varies in accordance with the age of the human being and the gender of the human being, in particular, a person having a pupil distance shorter than the normal value can be put in the state of outward divergence with ease.

In addition, in the real world, the visual lines of the eyes are oriented in directions to the observed point and the focal points of the eyes are adjusted to the observed point. Thus, the convergence of the eyeballs matches the distance being adjusted. When visually perceiving a 2D image for the left eye and a 2D image for the right eye as a 3D image, however, the convergence is adjusted to a position at which the 3D image is visually perceived, but the adjustment is carried out as adjustment to the image display screen. Thus, the distance obtained from the convergence of the eyeballs does not match the distance obtained as a result of the adjustment. Accordingly, if the spatial and depth effects of a viewed object are emphasized by increasing the binocular disparity, the state of mismatching between the distance obtained from the convergence of the eyeballs and the distance obtained as a result of the adjustment will be changed in a direction in which the distances further mismatch each other. As a result, the image viewer visually perceives unnaturalness with ease and easily feels discomfort as well as visual fatigue.

In order to solve the problem described above, there has also been proposed a method for adjusting the binocular disparity in order to reduce the discomfort and the visual fatigue which are felt by the image viewer. In accordance with a method disclosed in Japanese Patent No. 3749227 (hereinafter referred to as Patent Document 1) for example, a plurality of sample images having binocular disparities set at values different from each other are presented and the binocular disparity is adjusted by obtaining a response as to whether the binocular disparity is acceptable for each of the presented sample images.

If an effort is made in order to reduce the discomfort and the visual fatigue which are felt by the image viewer by adoption of the method disclosed in Patent Document 1, however, the binocular disparity is basically adjusted in a direction to decrease the spatial and depth effects of the viewed object so that the realistic sensation and/or the feeling of the reality are undesirably lost. In addition, if the spatial and depth effects visually perceived from the binocular 3D information are different from the spatial and depth effects visually perceived from the single-eye 3D information, the image viewer will also feel unnaturalness.

Thus, the method for emphasizing the spatial and depth effects of a 3D image by increasing the binocular disparity is not a proper method.

On the other hand, there has also been proposed a method for emphasizing the spatial and depth effects by making use of single-eye 3D information. According to a proposed method disclosed in Japanese Patent Laid-open No. 2001-238231 (hereinafter referred to as Patent Document 2) for example, the single-eye 3D information of an object is changed in accordance with the location of the object in the image in order to emphasize the depth effect. In this case, the changed single-eye 3D information is shading, a shielding relation and a characteristic representing a state of blurring.

SUMMARY

However, Patent Document 2 does not concretely disclose which parameters are to be set, what formulas are to be used as bases for setting the parameters and what values are to be used as values at which the parameters are to be set. Even if a parameter is set at a value on a trial-and-error basis, there is no assurance that the resulting 2D image for the left eye and the resulting 2D image for the right eye are natural and comfortable to the human being. Rather, it is also within the bounds of possibility that the image viewer feels unnaturalness and discomfort which result in a visual fatigue.

It is thus desired for the present application to address the problems described above to give a capability of presenting a 3D image more hardly causing a human being to have a feeling of discomfort and a feeling of displeasure by adjusting parameters of single-eye 3D information on the basis of the visual-sense characteristic of the human being.

An image processing apparatus according to an embodiment of the present application includes:

a depth-adjustment-quantity determination section configured to determine a depth adjustment quantity of an input 3D image;

an evaluation-function storage section configured to store an evaluation function representing a relation between an input value and a subjective depth quantity defined as a depth quantity subjectively felt by the user where the input value is the sum of N products each obtained as a result of multiplying the contrast of each individual one of spatial-frequency components included in the input 3D image by a weight assigned to the individual spatial-frequency component for a case in which spatial-frequency components included in the entire input 3D image are classified into N spatial-frequency components;

an input-value-adjustment-quantity determination section configured to determine the adjustment quantity of the input value on the basis of the evaluation function to serve as an adjustment quantity corresponding to the depth adjustment quantity;

an adjustment-gain computation block configured to compute a gain value of each of the spatial-frequency components on the basis of the adjustment quantity determined by the input-value-adjustment-quantity determination section to serve as the adjustment quantity of the input value; and an image adjustment block configured to adjust the spatial-frequency components of the input 3D image in accordance with the gain values computed by the adjustment-gain computation block for the spatial-frequency components respectively.

An image processing method according to the embodiment of the present application includes:

determining a depth adjustment quantity of an input 3D image;

determining the adjustment quantity of an input value to serve as an adjustment quantity corresponding to the determined depth adjustment quantity on the basis of an evaluation function representing a relation between the input value and a subjective depth quantity defined as a depth quantity subjectively felt by the user where the input value is the sum of N products each obtained as a result of multiplying the contrast of each individual one of spatial-frequency components included in the input 3D image by a weight assigned to the individual spatial-frequency component for a case in which the spatial-frequency components included in the entire input 3D image are classified into N spatial-frequency components;

computing a gain value of each of the spatial-frequency components on the basis of the determined adjustment quantity of the input value; and adjusting the spatial-frequency components of the input 3D image in accordance with the gain values computed for the spatial-frequency components respectively.

An image processing program provided in accordance with the embodiment of the present application serves as a program to be executed by a computer to carry out processing including:

determining a depth adjustment quantity of an input 3D image;

determining the adjustment quantity of an input value to serve as an adjustment quantity corresponding to the determined depth adjustment quantity on the basis of an evaluation function representing a relation between the input value and a subjective depth quantity defined as a depth quantity subjectively felt by the user where the input value is the sum of N products each obtained as a result of multiplying the contrast of each individual one of spatial-frequency components included in the input 3D image by a weight assigned to the individual spatial-frequency component for a case in which the spatial-frequency components included in the entire input 3D image are classified into N spatial-frequency components;

computing a gain value of each of the spatial-frequency components on the basis of the determined adjustment quantity of the input value; and adjusting the spatial-frequency components of the input 3D image in accordance with the gain values computed for the spatial-frequency components respectively.

In accordance with the embodiment of the present application, a depth adjustment quantity of an input 3D image is determined. In addition, the adjustment quantity of an input value is determined to serve as an adjustment quantity corresponding to the determined depth adjustment quantity on the basis of an evaluation function representing a relation between the input value and a subjective depth quantity defined as a depth quantity subjectively felt by the user where the input value is the sum of N products each obtained as a result of multiplying the contrast of each individual one of spatial-frequency components included in the input 3D image by a weight assigned to the individual spatial-frequency component for a case in which the spatial-frequency components included in the entire input 3D image are classified into N spatial-frequency components. On top of that, a gain value of each of the spatial-frequency components is computed on the basis of the determined adjustment quantity of the input value whereas the spatial-frequency components of the input 3D image are adjusted in accordance with the gain values computed for the spatial-frequency components respectively.

It is to be noted that the image processing program can be presented to the user by transmitting the program through a transmission medium or by recording the program onto a recording medium in a recording apparatus.

The recording apparatus can be an independent unit or an internal block included in an apparatus.

In accordance with an embodiment of the present application, the depth effect of a 3D image can be controlled.

In accordance with the embodiment of the present application, by adjusting parameters of single-eye 3D information on the basis of the visual-sense characteristic of a human being, it is possible to provide the human being with a 3D image more hardly causing the human being to have a feeling of discomfort and a feeling of displeasure.

Additional features and advantages are described herein, and will be apparent from the following Detailed Description and the figures.

BRIEF DESCRIPTION OF THE FIGURES

FIG. 15 is a block diagram showing a typical configuration of a computer according to an embodiment of the present application.

DETAILED DESCRIPTION

Hereinafter, embodiments of the present application will be described with reference to drawings.

1. First Embodiment

[Typical Configuration of the Image Processing Apparatus]

Figure 1:
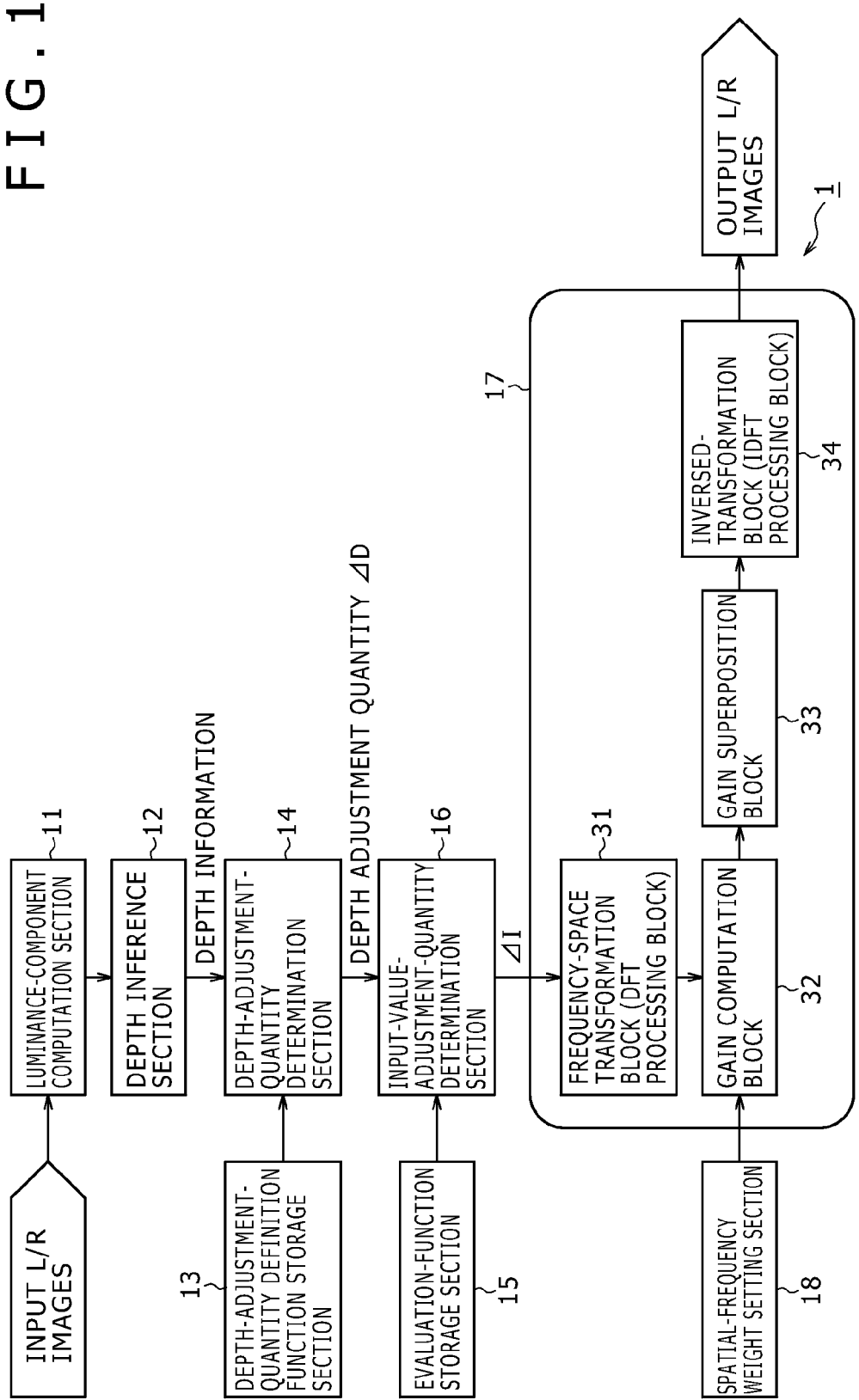
FIG. 1 is a block diagram showing a typical configuration of an image processing apparatus according to a first embodiment of the present application.

FIG. 1 is a block diagram showing a typical configuration of an image processing apparatus 1 according to a first embodiment of the present application.

The image processing apparatus 1 carries out processing to adjust the spatial frequencies of an input 3D image in order to emphasize the depth effect of the 3D image. In this case, the 3D image is a 2D image for making the image viewer visually perceive the 2D image as a 3D image.

A 3D image input by the image processing apparatus 1 is supplied to a luminance-component computation section 11. It is to be noted that the 3D image received by the image processing apparatus 1 from an external source can have a variety of data formats. However, the data formats are not prescribed in particular. Typical data formats of the input 3D image include first, second and third data formats. The first data format is the format of a stereo image composed of an L image which is an image for the left eye and an R image which is an image for the right eye. The second data format is the format of a multi-viewpoint image composed of a plurality of viewpoint images. Typically, the multi-viewpoint image is composed of three or more viewpoint images. The third data format is a format provided for a 2D image and the depth information of the 2D image. In this embodiment, it is assumed that image data of a 3D image is supplied to the image processing apparatus 1 in the first data format and the image processing apparatus 1 thus carries out processing on the left-eye and right-eye images of the 3D image.

The luminance-component computation section 11 computes the luminance component of the input 3D image composed of an image for the left eye and an image for the right eye. If the 3D image is represented by a linear expression based on RGB (red, green, blue) values in an RGB color coordinate system for example, the luminance-component computation section 11 computes the luminance component of the input 3D image by transforming RGB values into the luminance value Y in accordance with Eq. (1) prescribed in the ITU-R BT709 specification as follows.

$$Y = 0.2126R + 0.7152G + 0.0722B \qquad (1)$$

By making use of Eq. (1), the luminance image of an image for the left eye or the right eye can be obtained. In the following description, if the image for the left eye and the image for the right eye are not distinguished from each other, the luminance image of the image for the left eye and the luminance image of the image for the right eye are referred to simply as the luminance image. In addition, even in the case of a 3D image, processing is carried out on the luminance image of the image for the left eye and the luminance image of the image for the right eye. It is to be noted that it is not always necessary to represent the 3D image by an expression based on RGB values (or RGB signals). That is to say, if the 3D image is represented by XYZ values in a CIE XYZ color coordinate system, an image configured from luminance values Y is taken as the luminance image. In addition, the luminance value can also be computed by adoption of a method other than the method based on Eq. (1). The luminance-component computation section 11 supplies the luminance image obtained as a result of the computation carried out thereby to a depth inference section 12.

The depth inference section 12 infers the depth information (or the disparity) for every pixel of the luminance image received from the luminance-component computation section 11. To put it concretely, the depth inference section 12 computes the so-called binocular disparity which is a horizontal-direction shift between corresponding points in a stereo image and, on the basis of the computed binocular disparity, approximately computes the depth information. The depth inference section 12 is capable of computing the binocular disparity by adoption of a technique such as a block matching technique or a DP (Dynamic Programming) matching technique.

In addition, if the 3D image received by the image processing apparatus 1 has the second data format, the depth inference section 12 computes the binocular disparity for two corresponding viewpoint images of the three or more viewpoint images and, on the basis of the computed binocular disparity, approximately computes the depth information. If the 3D image received by the image processing apparatus 1 has the third data format, on the other hand, the depth information itself is supplied to the depth inference section 12 so that the depth inference section 12 makes use of the depth information supplied thereto.

The depth inference section 12 supplies the depth information to a depth-adjustment-quantity determination section 14.

A depth-adjustment-quantity definition function storage section 13 is used for storing a depth-adjustment-quantity definition function defining a depth adjustment quantity for every depth information (or every depth value). The depth-adjustment-quantity determination section 14 reads out the depth-adjustment-quantity definition function from the depth-adjustment-quantity definition function storage section 13.

[Typical Depth-Adjustment-Quantity Definition Function]

Figure 2:
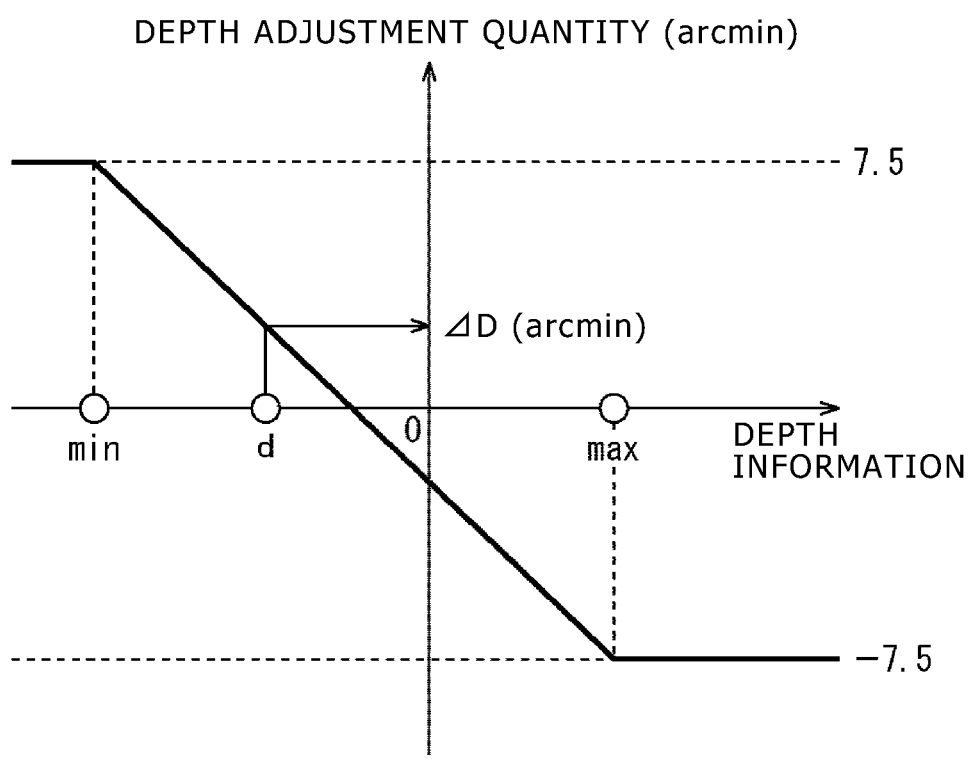
FIG. 2 is a diagram showing a typical depth-adjustment-quantity definition function.

FIG. 2 is a diagram showing a typical depth-adjustment-quantity definition function stored in the depth-adjustment-quantity definition function storage section 13.

The horizontal axis of FIG. 2 represents the depth information (pixel) detected in the input 3D image whereas the vertical axis of FIG. 2 represents the depth adjustment quantity (arcmin). A positive value of the depth information of an object on the image represents a disparity at which the user visually perceives the object on the inner side whereas a negative value of the depth information of an object on the image represents a disparity at which the user visually perceives the object on the outer side. On the other hand, a positive value of the depth adjustment quantity represents a change toward the outer side whereas a negative value of the depth adjustment quantity represents a change toward the inner side.

In accordance with the depth-adjustment-quantity definition function shown in FIG. 2, an object existing on a relatively inner side in the input 3D image as indicated by the depth information is moved by a change represented by the depth adjustment quantity as a change toward a position on a more inner side but an object existing on a relatively outer side in the input 3D image as indicated by the depth information is moved by a change represented by the depth adjustment quantity as a change toward a position on a more outer side. Thus, the depth-adjustment-quantity definition function is defined as a function to increase the spatial effect of the entire 3D image.

On the basis of such a depth-adjustment-quantity definition function stored in the depth-adjustment-quantity definition function storage section 13, the depth-adjustment-quantity determination section 14 shown in FIG. 1 determines a depth adjustment quantity for every pixel of the luminance image. For example, for a pixel having depth information of d in the luminance image, the depth-adjustment-quantity determination section 14 determines a depth adjustment quantity of ΔD in accordance with the depth-adjustment-quantity definition function.

Refer back to FIG. 1. An evaluation-function storage section 15 is used for storing an evaluation function quantifying a relation between an input value I and a subjective depth quantity z. The input value I is a value obtained from a 3D image by carrying out a visual-perception experiment whereas the subjective depth quantity z is visually perceived in a subjective manner.

[Explanation of the Evaluation Function]

Figure 3:
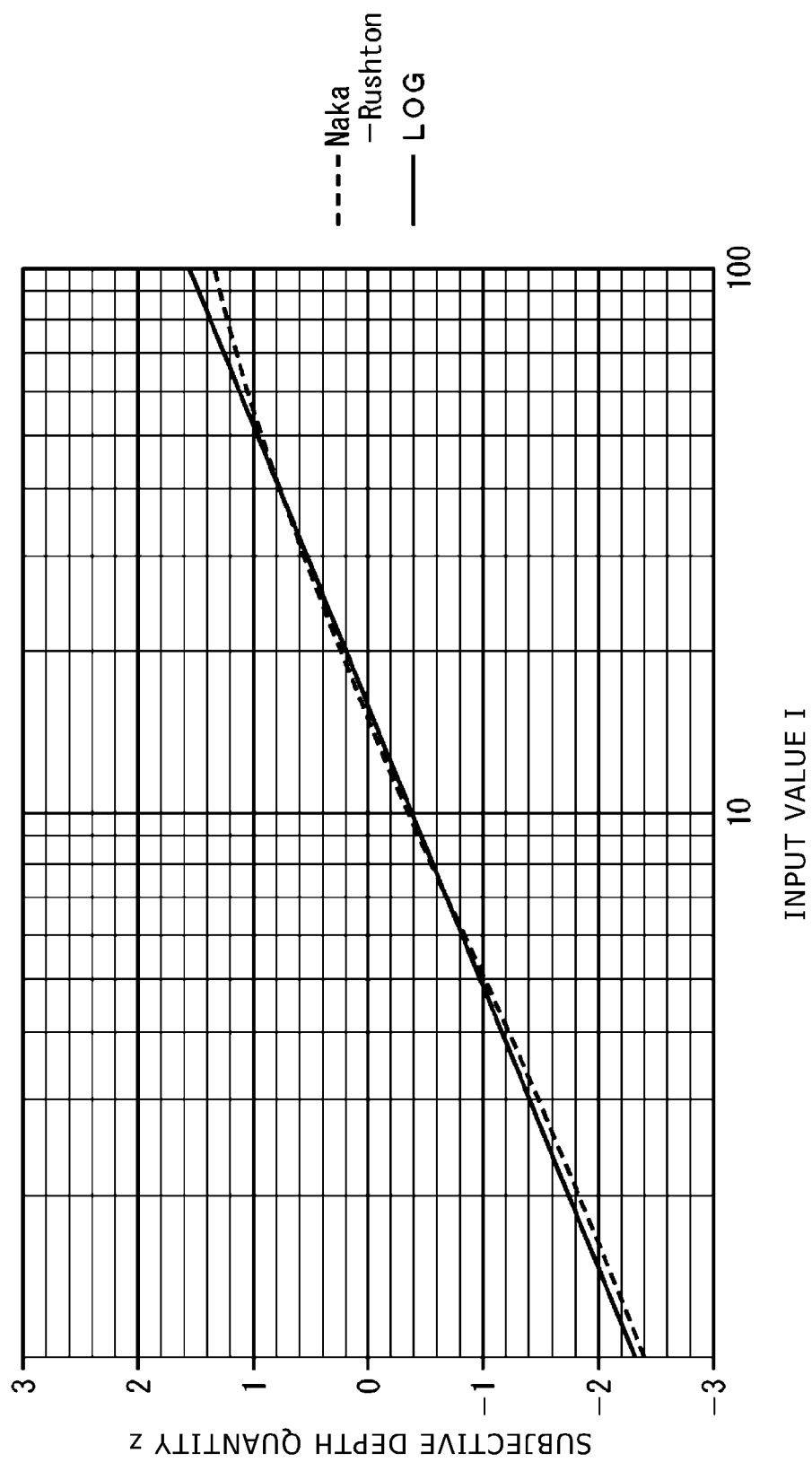
FIG. 3 is a diagram showing a typical evaluation function.

FIG. 3 is a diagram showing a typical evaluation function by carrying out a visual-perception experiment.

The logarithmic horizontal axis of FIG. 3 represents the input value I expressed by Eq. (2) given below whereas the vertical axis of the figure represents the subjective depth quantity z.

$$I = \sum_{f_s} \{C(f_s) \cdot E(f_s)\} \quad (2)$$

Notation $C(f_s)$ used in Eq. (2) represents the contrast of a spatial-frequency component $f_s$ for a case in which spatial-frequency components included in the entire luminance image are classified into N spatial-frequency components $f_s$. Notation $E(f_s)$ used in Eq. (2) represents the depth efficiency of a spatial frequency $f_s$. The depth efficiency $E(f_s)$ of a spatial frequency $f_s$ is a weight assigned to the depth visual perception for the spatial frequency $f_s$. The depth efficiency $E(f_s)$ of a spatial frequency $f_s$ is a value found by carrying out a visual-perception experiment.

Thus, the input value I can be said to be the sum of products obtained for the N spatial-frequency components $f_s$ of the entire luminance image. The products are each obtained as a result of multiplying the contrast of a spatial-frequency component $f_s$ by a weight assigned to the spatial-frequency component $f_s$.

Figure 4:
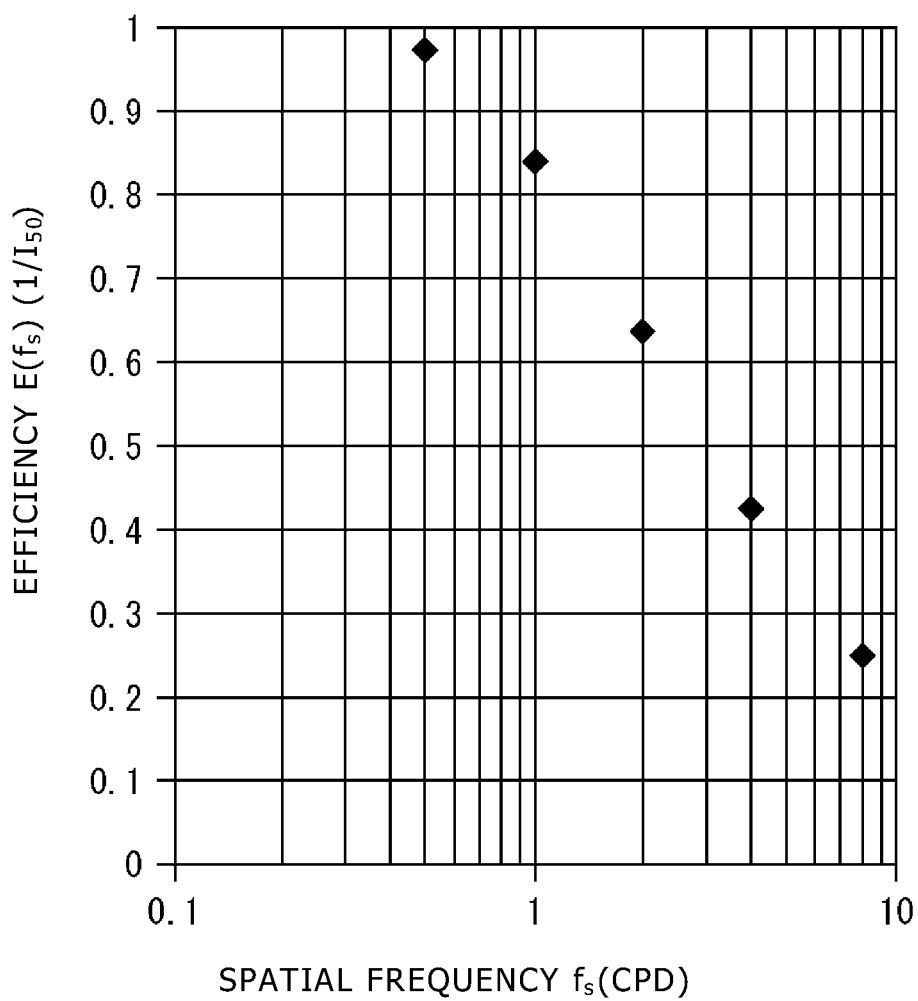
FIG. 4 is a diagram showing a relation between a spatial frequency and a depth efficiency.

FIG. 4 is a diagram showing a relation between the spatial frequency $f_s$ and the depth efficiency $E(f_s)$ found by carrying out a visual-perception experiment.

The spatial frequency $f_s$ represented by the horizontal axis of the figure is defined as contrast which is a white/black-color contrasting density change entering a 1-degree visual angle of the eye of a human being. The spatial frequency $f_s$ is expressed in terms of cpd (cycles per degree) units.

In the visual-perception experiment, an image (or a pattern) having a variety of spatial frequencies $f_s$ is presented to a person subjected to the visual-perception experiment and the experiment is carried out to know the degree with which the person subjected to the visual-perception experiment feels the depth quantity (or the depth position) from the image.

In accordance with the data shown in FIG. 4, the relation between the spatial frequency $f_s$ and the depth efficiency $E(f_s)$ indicates that, the higher the spatial frequency $f_s$, the smaller the weight, that is, the smaller the effect on the depth visual perception.

The depth efficiency $E(f_s)$ shown in the expression on the right-hand side of Eq. (2) can be expressed by a formula representing a relation shown in FIG. 4 as a relation between the spatial frequency $f_s$ and the depth efficiency $E(f_s)$. As a typical example of the formula, it is possible to make use of Eq. (3) which is a Gauss approximation formula given as follows.

$$E(f_s) = A \cdot \exp\left(-\frac{(\log_{10}(f_s) + f_{s0})^2}{2\sigma_s^2}\right) \quad (3)$$

where A=1, $f_{s0}$=0.4987 and $\sigma_s$=0.8406

In the above equation, notation A denotes a coefficient, notation $f_{s0}$ denotes an offset of the spatial frequency $f_s$ and notation $\sigma_s$ denotes a standard deviation of the spatial frequency $f_s$.

On the other hand, the subjective depth quantity z represented by the vertical axis of FIG. 3 is a result of carrying out transformation on actual data x, which is an actual depth quantity visually perceived by the person subjected to the visual perception experiment, in accordance with Eq. (4) given below. That is to say, the subjective depth quantity z is a normalized or standardized value of the actual data x. By making use of such a subjective depth quantity z, the data units can be made uniform for various kinds of data so that data can be compared to each other with ease. It is thus possible to carry out an analysis getting rid of absolute variations of actual data.

$$z = \frac{x - \bar{x}}{\sigma} \quad (4)$$

In the above equation, notation x denotes the actual data (arcmin), notation $\bar{x}$ denotes the average value of the actual data, and notation $\sigma$ denotes the standard deviation of the actual data.

A large value of the subjective depth quantity z indicates that the image viewer visually percepts the object on the outer side and, the larger the value, the closer the outer side to the viewer. By making use of Eq. (5) given below, the subjective depth quantity z can be transformed into a depth adjustment quantity taking arcmin as its unit.

$$PES = z \times \sigma + ave \quad (5)$$

In the above equation, notation PES denotes the depth information (arcmin), notation z denotes the subjective depth quantity, notation $\sigma$ denotes the standard deviation of 20.71 and notation ave denotes the average value of 13.69.

An evaluation function expressing a relation between the input value I obtained from the 3D image and the subjective depth quantity z can be expressed by two kinds of formulas. One of the formulas is typically a Naka-Rushton equation used for responses given by a visual-perception system whereas the other formula is typically the following logarithmic equation:

$$z = A \times \log_{10}(I) + B$$

where notations A and B each denote a constant.

The evaluation function represented by a solid line shown in FIG. 3 is provided for a case in which the relation between the input value I and the subjective depth quantity z is defined as a logarithmic function. This evaluation function is expressed by Eq. (6) given below. On the other hand, the evaluation function represented by a dashed line shown in FIG. 3 is provided for a case in which the relation between the input value I and the subjective depth quantity z is defined by the Naka-Rushton equation. This evaluation function is expressed by Eq. (7) as follows.

$$z = 1.94 \times \log_{10}(I) - 2.32 \qquad (6)$$

$$z = 6.432 \times \frac{I^{0.5872}}{I^{0.5872} + 5.821^{0.5872}} - 4.073 \qquad (7)$$

It is obvious that, in accordance with the evaluation functions, by carrying out adjustment to increase the input value I of the 3D image, it is possible to make the image viewer visually perceive the object on the outer side. If it is desired to make the image viewer visually perceive the object on the inner side, on the other hand, it is necessary to carry out adjustment opposite to the adjustment to increase the input value I of the 3D image.

Figure 5:
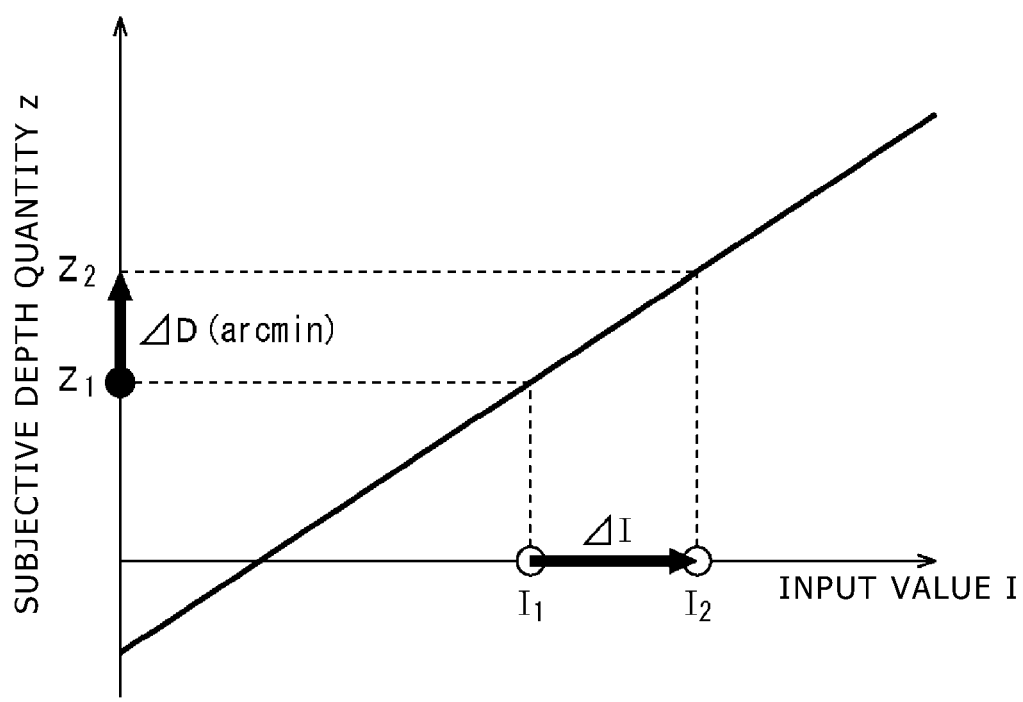
FIG. 5 is an explanatory diagram to be referred to in description of processing carried out by an input-value adjustment-quantity determination section.

In order to carry out the adjustment based on the evaluation function described above, there is provided a input-value-adjustment-quantity determination section 16 configured to determine the adjustment quantity ΔI of the input value I for the depth adjustment quantity ΔD, which is determined by the depth-adjustment-quantity determination section 14, in accordance with a characteristic shown in FIG. 5.

To put it concretely, first of all, the input-value-adjustment-quantity determination section 16 transforms the depth adjustment quantity ΔD determined by the depth-adjustment-quantity determination section 14 into an adjustment quantity Δz of the subjective depth quantity z in accordance with Eq. (4) given before. Then, the input-value-adjustment-quantity determination section 16 determines the adjustment quantity ΔI ($=I_1-I_2$) of the input value I for the depth adjustment quantity Δz resulting from the transformation as the adjustment quantity Δz of the subjective depth quantity z.

It is to be noted that notation $z_1$ shown on the vertical axis of FIG. 5 denotes the subjective depth quantity z of the 3D image at the input time prior to the adjustment of the subjective depth quantity whereas notation $z_2$ shown on the vertical axis denotes the subjective depth quantity z of the 3D image obtained as a result of the adjustment of the subjective depth quantity. On the other hand, notation $I_1$ shown on the horizontal axis of FIG. 5 denotes the input value I of the 3D image at the input time prior to the adjustment of the subjective depth quantity whereas notation $I_2$ shown on the horizontal axis denotes the input value I of the 3D image obtained as a result of the adjustment of the subjective depth quantity. In order to carry out the adjustment of the subjective depth quantity, however, it is not necessary to know the input values $I_1$ and $I_2$ themselves, but it is sufficient to know only their difference which is the adjustment quantity ΔI of the input value I. By making use of Eq. (7) representing a logarithmic evaluation function expressed by a line having an all but constant gradient, the adjustment quantity ΔI of the input value I can be found with ease.

Refer back to FIG. 1. As described above, the input-value-adjustment-quantity determination section 16 determines the adjustment quantity ΔI of the input value I for the depth adjustment quantity ΔD received from the depth-adjustment-quantity determination section 14.

A depth control section 17 adjusts the spatial-frequency component of the 3D image so as to satisfy the adjustment quantity ΔI determined by the input-value-adjustment-quantity determination section 16 as the adjustment quantity ΔI of the input value I. In this way, depths of the 3D image are adjusted (or controlled) and a 3D image obtained as a result of the adjustment is output.

As shown in FIG. 1, the depth control section 17 has a frequency-space transformation block 31, a gain computation block 32, a gain superposition block 33 and an inversed-transformation block 34.

The frequency-space transformation block 31 transforms the 3D image into a frequency space. That is to say, the frequency-space transformation block 31 carries out DFT (Discrete Fourier Transformation) processing on (the data of) the input 3D image so as to perform transformation from an image space into a frequency space. In the following description, the 3D image completing the transformation from an image space into a frequency space is referred to as a frequency-space image. The frequency-space transformation block 31 supplies the frequency-space image to the gain superposition block 33.

The gain computation block 32 computes the gain of each spatial frequency $f_s$ as a gain satisfying an adjustment quantity ΔI received from the input-value-adjustment-quantity determination section 16 as the adjustment quantity ΔI of the input value I, and supplies the computed gain to the gain superposition block 33.

The gain superposition block 33 superposes the gain received from the gain computation block 32 on the frequency-space image received from the frequency-space transformation block 31 in order to adjust (or change) the spatial frequency of the 3D image.

The inversed-transformation block 34 carries out IDFT (Inversed DFT) processing on the frequency-space image received from the gain superposition block 33 in order to perform transformation from the frequency space back to the image space. Then, the inversed-transformation block 34 outputs a 3D image resulting from the IDFT processing as a 3D image resulting from the spatial-frequency adjustment.

A spatial-frequency weight setting section 18 sets a weight function $F(f_s)$ on the basis of an operation carried out by the user. The weight function $F(f_s)$ represents gain weights each to be assigned to a spatial frequency $f_s$. The gain weight is required in the computation of the gain of each spatial frequency $f_s$ in the gain computation block 32. The spatial-frequency weight setting section 18 supplies the gain weights represented by the weight function $F(f_s)$ to the gain computation block 32. The spatial-frequency weight setting section 18 is used for storing a variety of weight functions $F(f_s)$ having, among others, characteristics of emphasizing the low-frequency side, the high-frequency side and all sides as will be described later in detail.

The image processing apparatus 1 has the configuration described above.

[Detailed Processing of the Depth Control Section 17]

Next, details of processing carried out by the depth control section 17 are explained by referring to FIGS. 6 to 8B as follows.

Figure 6:
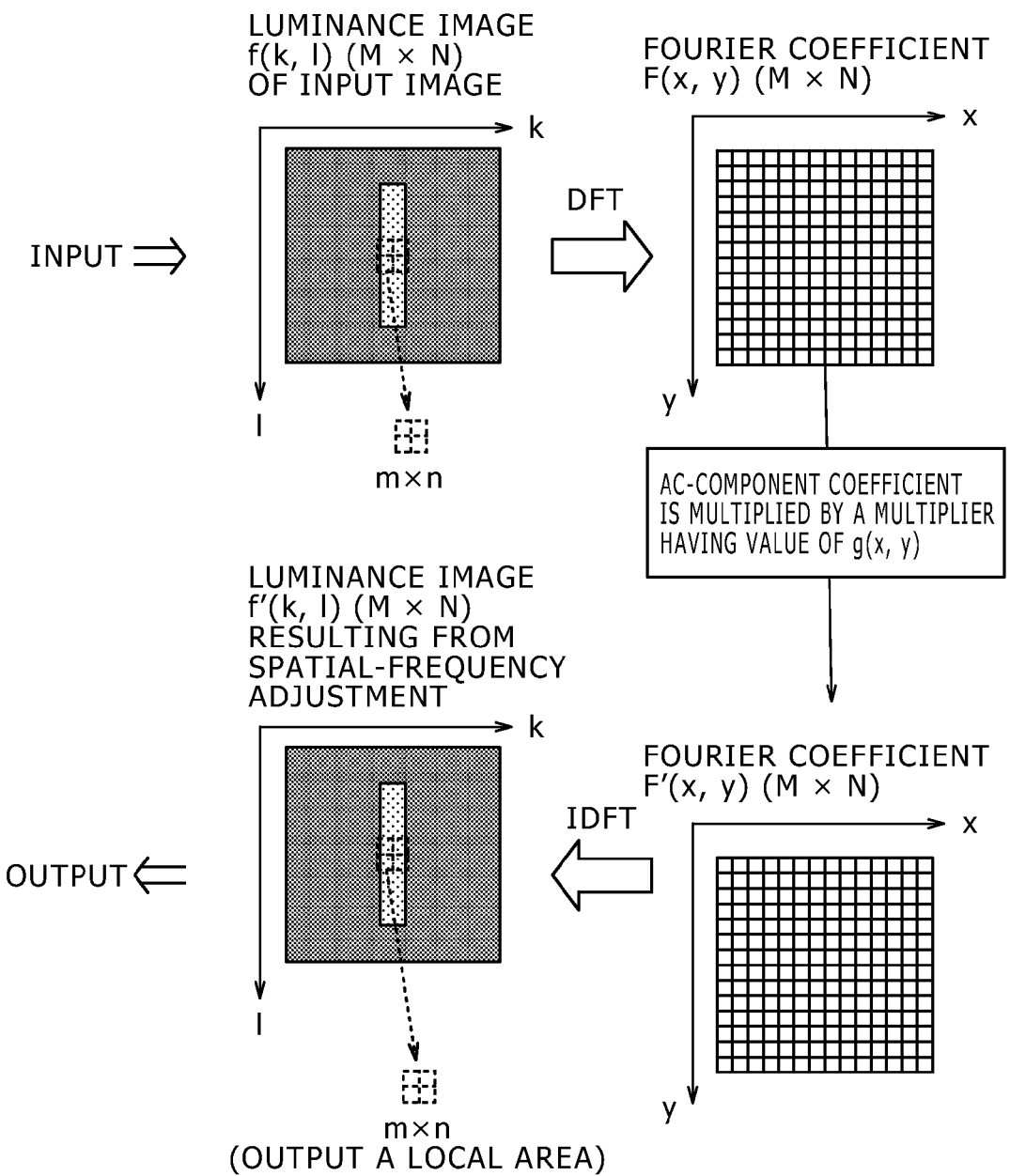
FIGS. 6 to 8B are explanatory diagrams to be referred to in description of details of processing carried out by a depth control section.

FIG. 6 is an explanatory diagram referred to in the following description of details of the processing carried out by the depth control section 17.

The following description explains a case in which m×n pixels located at a position determined in advance in a 3D image (or a luminance image) used as an input image to serve as the object of spatial-frequency adjustment processing draw attention, where notations m and n each denote an integer greater than 0 (that is, m, n>0). That is to say, the spatial-frequency adjustment processing is carried out to adjust the luminance values (or the pixel values) of the m×n pixels. In this case, M×N pixels surrounding the m×n pixels are set in a processing-object area where notations M and N denote integers greater than the integers m and n respectively (that is, M>m, N>n). Typical values of the integers m, n, M and N are given as follows: m, n=2 and M, N=114.

The frequency-space transformation block 31 carries out DFT processing on the data of the input 3D image so as to transform the image from an image space into a frequency space. Let notation f(k, l) denote the luminance image in the image space whereas notation F(x, y) denote the Fourier coefficient obtained as a result of the transformation of the 3D image from the image space into the frequency space. In this case, the processing carried out by the frequency-space transformation block 31 can be expressed by Eq. (8) given as follows.

$$F(x, y) = \frac{1}{MN} \sum_{k=0}^{M-1} \sum_{l=0}^{N-1} f(k, l) W_M^{kx} W_N^{ly} \quad (8)$$

In the above equation, notations k, l, x, y, $W_M$ and $W_N$ denote quantities having values as follows.

k=0, 1, 2, . . . , M−1
l=0, 1, 2, . . . , N−1
x=0, 1, 2, . . . , M−1
y=0, 1, 2, . . . , N−1

$$W_M = e^{-2j\pi/M}, W_N = e^{-2j\pi/N}$$

Then, the spatial-frequency weight setting section 18 sets a weight function $F(f_s)$ on the basis of an operation carried out by the user. The weight function $F(f_s)$ represents gain weights each to be assigned to a spatial frequency $f_s$. The spatial-frequency weight setting section 18 supplies the gain weights to the gain computation block 32 as a weight function $F(f_s)$.

Figure 7A:
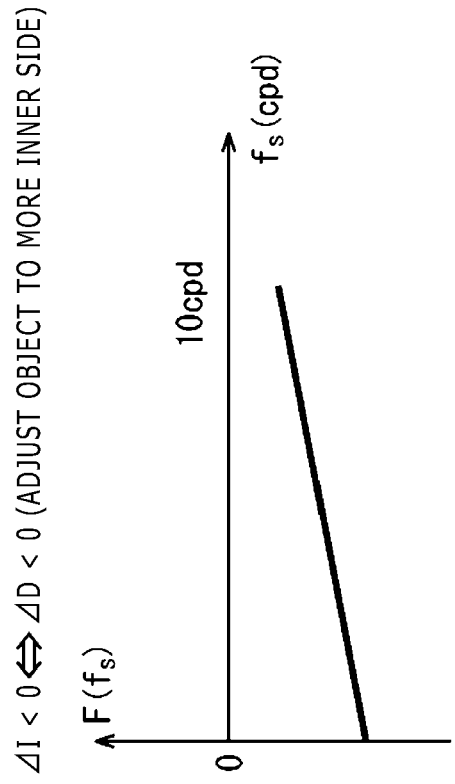
Figure 7B:
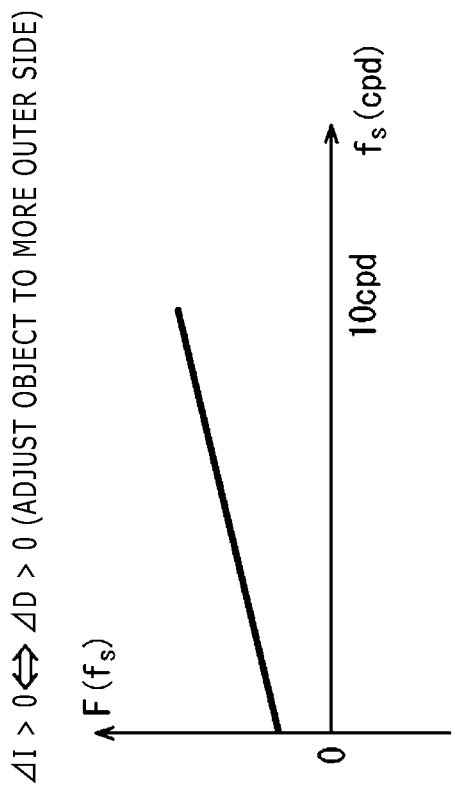

FIGS. 7A and 7B are a plurality of diagrams each showing a typical weight function $F(f_s)$ representing gain weights each to be assigned to a spatial frequency $f_s$.

In the case of a positive depth adjustment quantity ΔD, a positive adjustment quantity ΔI of the input value I is also required (that is, ΔD>0⇔ΔI>0). Thus, the spatial-frequency weight setting section 18 provides the gain computation block 32 with a weight function $F(f_s)$ satisfying a constraint condition requiring that the adjustment quantity ΔI of the input value I shall also be positive.

FIG. 7A is a diagram showing a weight function $F(f_s)$ supplied by the spatial-frequency weight setting section 18 to the gain computation block 32 to serve as a weight function $F(f_s)$ satisfying a constraint condition requiring that the adjustment quantity ΔI of the input value I shall be positive (that is, ΔI>0). In other words, FIG. 7A shows a typical weight function $F(f_s)$ for adjusting an object on the luminance image to a position on a more outer side.

Since the weight function $F(f_s)$ shown in FIG. 7A is set to always represent positive gain weights for all spatial frequencies $f_s$, the constraint condition of ΔI>0 is satisfied. In addition, the weight function $F(f_s)$ shown in FIG. 7A is set to particularly emphasize spatial-frequency components on the high-frequency side.

In the case of a negative depth adjustment quantity ΔD, on the other hand, a negative adjustment quantity ΔI of the input value I is also required (that is, ΔD<0⇔ΔI<0). Thus, the spatial-frequency weight setting section 18 provides the gain computation block 32 with a weight function $F(f_s)$ satisfying a constraint condition requiring that the adjustment quantity ΔI of the input value I shall also be negative.

FIG. 7B is a diagram showing a weight function $F(f_s)$ supplied by the spatial-frequency weight setting section 18 to serve as a weight function $F(f_s)$ satisfying a constraint condition requiring that the adjustment quantity ΔI of the input value I shall be negative (that is, ΔI<0). In other words, FIG. 7B shows a typical weight function $F(f_s)$ for adjusting an object on the luminance image to a position on a more inner side.

Since the weight function $F(f_s)$ shown in FIG. 7B is set to always represent negative gain weights for all spatial frequencies $f_s$, the constraint condition of ΔI<0 is satisfied. In addition, the weight function $F(f_s)$ shown in FIG. 7B is set to suppress depressions of spatial-frequency components on the high-frequency side.

The gain computation block 32 receives the weight function $F(f_s)$ from the spatial-frequency weight setting section 18 and computes a spatial-frequency contrast $C'(f_s)$ satisfying the adjustment quantity ΔI of the input value I by making use of Eq. (9) based on the weight function $F(f_s)$ as follows:

$$\Delta I = \sum_{f_s} \{F(f_s) \times C'(f_s) \times E(f_s)\} \quad (9)$$

In the above equation, notation $C'(f_s)$ denotes the contrast obtained as a result of the spatial-frequency adjustment to serve as the contrast of a spatial frequency $f_s$.

A method for computing the contrast $C'(f_s)$ of a spatial frequency $f_s$ after the spatial-frequency adjustment is explained as follows.

First of all, the gain computation block 32 normalizes the Fourier coefficient F(x, y) obtained as a result of carrying out the DFT processing based on Eq. (8) into a value in a range of 0 to 100 in order to find the contrast C(x, y) of a spatial frequency $f_s$ prior to the spatial-frequency adjustment.

Figure 8B:
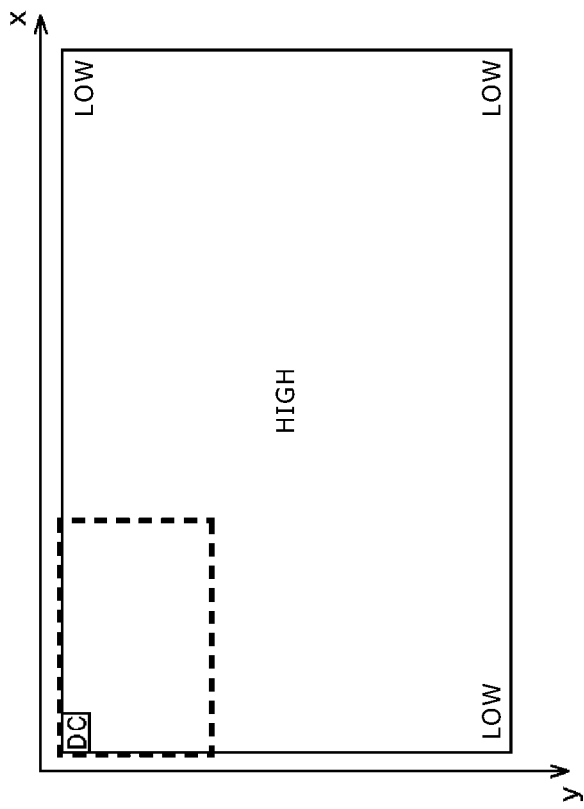
Figure 8A:
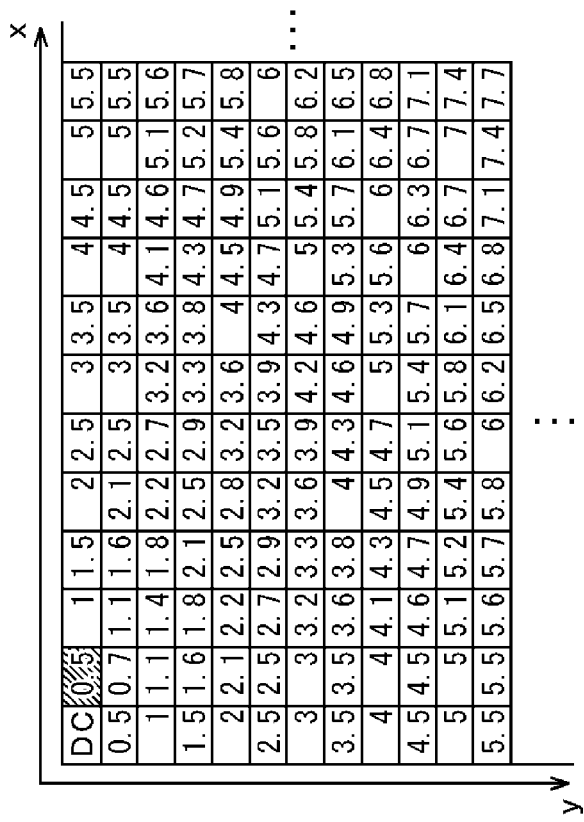

FIGS. 8A and 8B are diagrams showing a spatial-frequency correspondence table used in the processing carried out by the depth control section 17 to compute a frequency space. It is to be noted that FIGS. 8A and 8B show a typical table for M, N=114.

The spatial-frequency correspondence table includes 114 rows×114 columns which correspond to respectively 114× 114 pixels of the image space. Elements of the spatial-frequency correspondence table correspond to the spatial frequencies $f_s$. As shown in FIG. 8A, the spatial-frequency correspondence table is represented by a DC component placed on the left upper corner and AC components other than the DC component. The AC components of the spatial-frequency correspondence table are spatial frequencies in a range of approximately 0.5 cpd to 40 cpd. At the center of the spatial-frequency correspondence table including 114 rows×

114 columns, a high-frequency component is placed whereas low-frequency components are placed on boundaries (or surrounding locations) of the high-frequency component.

FIG. 8B is an enlarged diagram showing a portion enclosed by dashed lines in FIG. 8A. The portion enclosed by dashed lines contain the surroundings of the DC component. The value in each cell (element) of the portion enclosed by dashed lines is the spatial frequency $f_s$ corresponding to the cell.

Since the Fourier coefficient F(x, y) obtained as a result of execution of the DFT processing based on Eq. (8) as described above can be obtained by making use of such a spatial-frequency correspondence table, C(x, y) obtained by normalizing the Fourier coefficient F(x, y) into values in a range of 0 to 100 can also be found in the same way. Then, if C(x, y) is known, the contrast C($f_s$) of a spatial frequency $f_s$ prior to the spatial-frequency adjustment can also be found. For example, a dashed cell adjacent to the DC component shown in FIG. 8B is a cell C(1, 2) on the first row and the second column in the portion of the spatial-frequency correspondence table. In this case, a value stored in the cell C(1, 2) corresponds to C ($f_s$=0.5).

The gain computation block 32 normalizes the weight function F(fs) received from the spatial-frequency weight setting section 18 in order to find a post-normalization weight function F'(fs) in accordance with Eq. (10) given below so that the post-normalization weight function F'($f_s$) corresponds to the adjustment quantity ΔI.

$$F'(f_s) = \frac{b}{a} \times F(f_s) \quad (10)$$

In the above equation, notations a and b denote quantities expressed by expressions on the right side of each of the following equations:

$$a = \left| \sum_{f_s} \{F(f_s) \times C(f_s) \times E(f_s)\} \right|$$

$$b = |\Delta I|$$

By adoption of Eq. (10), it is possible to adjust the weight function F($f_s$) so that the weight function F($f_s$) becomes the adjustment quantity ΔI in the so-called subsequent processing. Thus, when setting the weight function F($f_s$) in the spatial-frequency weight setting section 18, the user needs to be careful of only the gain weight to be assigned to every spatial frequency $f_s$. Accordingly, the weight function F($f_s$) can be designed with ease.

Then, the gain computation block 32 sets a gain to be directly attached to the frequency-space image as the gain G($f_s$) of every spatial frequency $f_s$ in accordance with Eq. (11) given as follows:

$$G(f_s) = 1 + F'(f_s) \quad (11)$$

If the weight function F($f_s$) is normalized in accordance with Eq. (10) so that the adjustment quantity of the input value I becomes equal to ΔI, the weight function F($f_s$) may have a value in a range of 0 to 1 in some cases. For this reason, in accordance with Eq. (11), the eventual gain G($f_s$) of the spatial frequency $f_s$ is set at a value obtained by adding 1 to the normalized weight function F'($f_s$). Thus, for a positive weight function F($f_s$), that is, for F($f_s$)>0, the gain G($f_s$) becomes equal to at least 1 so that the depth control section 17 carries out processing to increase the contrast of each spatial frequency $f_s$. For a negative weight function F($f_s$), that is, for F($f_s$)<0, on the other hand, the gain G($f_s$) becomes smaller than 1 so that the depth control section 17 carries out processing to reduce the contrast of each spatial frequency $f_s$.

The gain computation block 32 transforms the gain G($f_s$) computed as the gain G($f_s$) of every spatial frequency $f_s$ into a gain g(x, y) having the DFT format of the Fourier transformation. That is to say, the gain computation block 32 transforms the gain G($f_s$) computed as the gain G($f_s$) of every spatial frequency $f_s$ into a gain g(x, y) having the format of the spatial-frequency correspondence table shown in FIGS. 8A and 8B.

The fact that the gain computation block 32 finds the gain G($f_s$) (=g(x, y)) of every spatial frequency $f_s$ as a gain G($f_s$) satisfying the adjustment quantity ΔI of the input value I means that the gain computation block 32 finds the spatial-frequency contrast C'($f_s$) satisfying the adjustment quantity ΔI of the input value I in accordance with Eq. (9).

Then, as shown in FIG. 6, the gain superposition block 33 superposes the gain g(x, y) received from the gain computation block 32 on the AC component of the Fourier coefficient F(x, y) completing the DFT processing in order to adjust the spatial frequency of the 3D image. That is to say, the gain superposition block 33 carries out gain superposition processing according to Eq (12) given below in order to find a Fourier coefficient F'(x, y) obtained as a result of the gain superposition processing:

$$F'(x,y) = F(x,y) \cdot g(x,y) \quad (12)$$

Finally, the inversed-transformation block 34 carries out IDFT (Inversed DFT) processing on the Fourier coefficient F'(x, y) obtained as a result of the gain superposition processing in order to perform an inversed transformation from the frequency space back into the image space. That is to say, the inversed-transformation block 34 finds the luminance image f'(k, l) obtained as a result of the spatial-frequency adjustment processing in accordance with Eq. (13) given as follows:

$$f(k, l) = \sum_{k=0}^{M-1} \sum_{l=0}^{N-1} F(x, y) W_M^{-kx} W_N^{-ly} \quad (13)$$

Then, the inversed-transformation block 34 outputs the luminance image f'(k, l) obtained as a result of the inversed transformation as a 3D image obtained as a result the spatial-frequency adjustment processing.

As described above, in this embodiment, the depth control section 17 carries out Fourier transformation processing as processing to transform a 3D image from the image space into the frequency space. It is to be noted, however, that it is possible to adopt other space-frequency transformation means for carrying out space-frequency transformation processing such as the wavelet transformation and the cosine transformation.

[Flowchart of the Depth Adjustment Processing]

Figure 9:
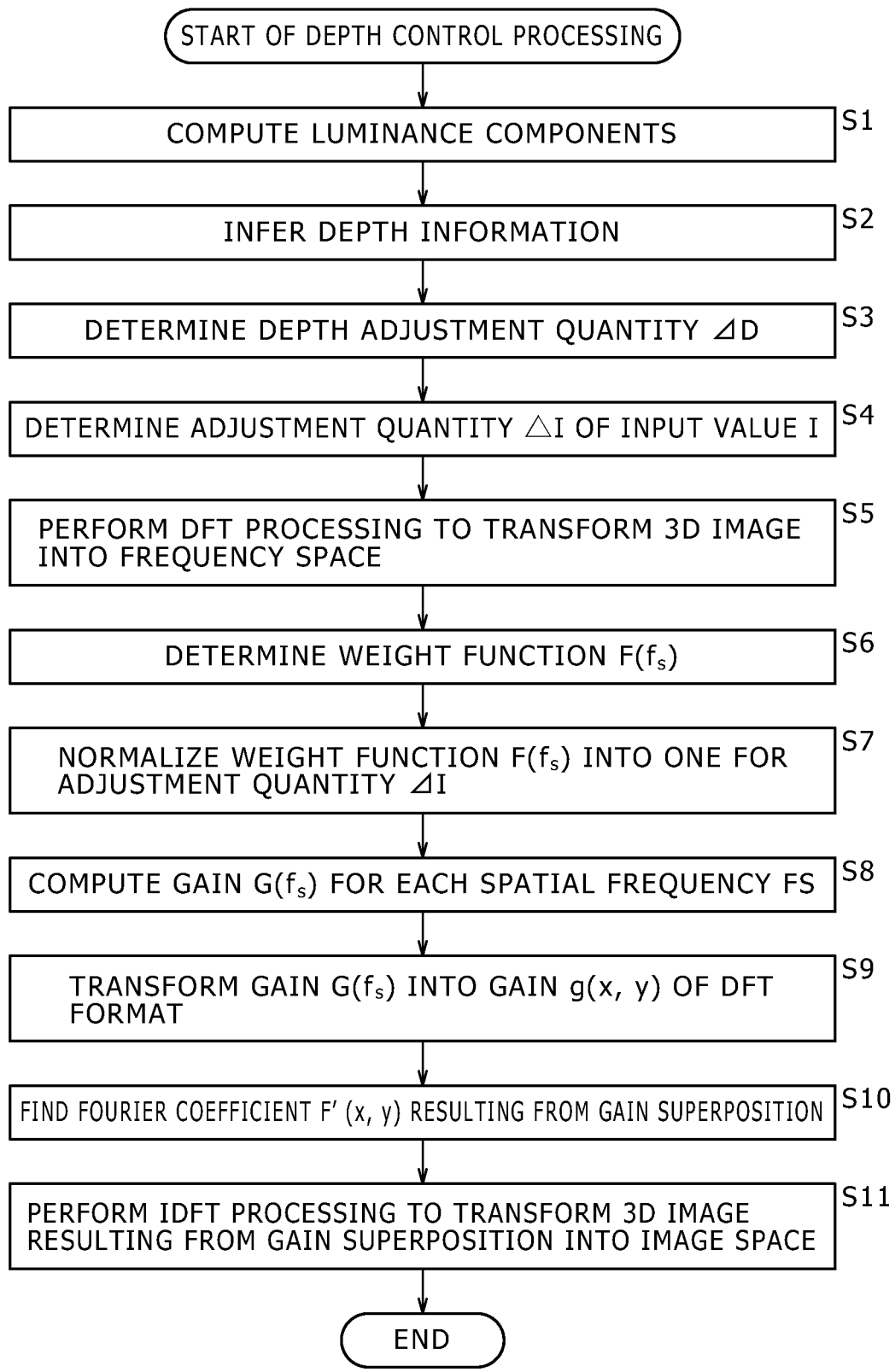
FIG. 9 shows a flowchart to be referred to in explanation of depth control processing.

Next, by referring to a flowchart shown in FIG. 9, the following description explains depth control processing carried out by the image processing apparatus 1 to control depths by adjusting spatial frequencies. This depth control processing is started by the image processing apparatus 1 typically when a 3D image is supplied to the image processing apparatus 1.

The flowchart shown in the figure begins with a step S1 at which the luminance-component computation section 11 computes a luminance component of the 3D image received from an external source. Thus, typically, the luminance images of a left-eye image referred to as an L image and a right-eye image referred to as an R image are supplied to the depth inference section 12.

Then, at the next step S2, the depth inference section 12 infers depth information (or a disparity) for every pixel of the 3D image (that is, the luminance image) received from the luminance-component computation section 11.

Subsequently, at the next step S3, the depth-adjustment-quantity determination section 14 determines the depth adjustment quantity ΔD for every pixel on the 3D image on the basis of a depth-adjustment-quantity definition function stored in the depth-adjustment-quantity definition function storage section 13.

Then, at the next step S4, the input-value-adjustment-quantity determination section 16 determines the adjustment quantity ΔI of the input value I as an adjustment quantity ΔI corresponding to the depth adjustment quantity ΔD, which has been determined at the step S3, on the basis of an evaluation function stored in the evaluation-function storage section 15.

Subsequently, at the next step S5, the frequency-space transformation block 31 carries out DFT processing in order to perform transformation on the 3D image serving as the input image from an image space into a frequency space.

Then, at the next step S6, the spatial-frequency weight setting section 18 determines a weight function $F(f_s)$ representing gain weights each to be assigned to one of the spatial frequencies $f_s$ on the basis of an operation carried out by the user and supplies the weight function $F(f_s)$ to the gain computation block 32.

Subsequently, at the next step S7, the gain computation block 32 normalizes the weight function $F(f_s)$ in order to find a post-normalization weight function $F'(f_s)$ in accordance with Eq. (10) given before so that the post-normalization weight function $F'(f_s)$ corresponds to the adjustment quantity ΔI.

A method for computing the input value I of M×N pixels is explained as follows. In order to compute the input value I of M×N pixels, for example, the following two types of computation method can be adopted.

The first computation method is a method for computing the input value I on the basis of Eq. (14) given below. In accordance with this computation method, the depth efficiency $E(f_s)$ expressed by Eq. (3) is transformed into $E(x, y)$, which is to be used in Eq. (14), on the basis of the spatial-frequency correspondence table shown in FIGS. 8A and 8B.

$$I = \sum_{y=0}^{113} \sum_{x=0}^{113} C(x, y) \cdot E(x, y) \quad (14)$$

The second computation method is a method of cumulative addition making use of spatial frequencies $f_s$ each determined as a reference. To put it concretely, five spatial frequencies $f_s$ of 0.5 cpd, 1.0 cpd, 2.0 cpd, 4.0 cpd and 8.0 cpd are each determined as a spatial frequency $f_s$ to be used as a reference.

First of all, in accordance with either Eq. (15) or Eq. (16) given below, a spatial-frequency contrast C(fs) in a predetermined range having its center coinciding with a reference spatial frequency $f_s$ is found to be used as the spatial-frequency contrast C(fs) of the reference spatial frequency $f_s$.

$$C(f_s) = \sum_{f_s - \Delta f_s \leq f'_s \leq f_s + \Delta f_s} C(f'_s) \quad (15)$$

$$C(f_s) = \sum_{f_s/\sqrt{2} \leq f'_s \leq \sqrt{2} \cdot f_s} C(f'_s) \quad (16)$$

where
$f_s \in \{0.5, 1.0, 2.0, 4.0, 8.0\}$

Then, in accordance with Eq. (17) given below, the input value I is found. That is to say, this equation is used to find the sum of products each obtained by multiplying the spatial-frequency contrast C(fs) of a reference spatial frequency $f_s$ by the depth efficiency $E(f_s)$ of the reference spatial frequency $f_s$.

$$I = \Sigma C(f_s) \cdot E(f_s) \quad (17)$$

$f_s \in \{0.5, 1.0, 2.0, 4.0, 8.0\}$

It is to be noted that the two computation methods do not have to be implemented as simple addition carried out on values. Instead, the two computation methods can each be implemented as addition carried out on values each obtained as an average for a plurality of adjacent spatial frequencies.

As described before, at the step S7, the gain computation block 32 normalizes the weight function $F(f_s)$ in order to find a post-normalization weight function $F'(f_s)$. Then, at the next step S8, the gain computation block 32 finds the gain $G(f_s)$ of every spatial frequency $f_s$ in accordance with Eq. (11) given earlier.

Subsequently, at the next step S9, the gain computation block 32 transforms the gain $G(f_s)$ computed for every spatial frequency $f_s$ into a gain $g(x, y)$ having the DFT format.

Then, at the next step S10, the gain superposition block 33 finds the Fourier coefficient F'(x, y) obtained as a result of the gain superposition in accordance with Eq. (12) given above.

Subsequently, at the next step S11, the inversed-transformation block 34 carries out IDFT processing in order to transform the Fourier coefficient F'(x, y) obtained as a result of the gain superposition from the frequency space back to the image space. Then, the inversed-transformation block 34 outputs a luminance image resulting from the IDFT processing as a 3D image resulting from the spatial-frequency adjustment. Finally, the depth control processing is ended.

In this way, in the image processing apparatus 1, the adjustment quantity ΔI of the input value I is determined as an adjustment quantity ΔI corresponding to a depth adjustment quantity which is determined as the depth adjustment quantity ΔD of every pixel of the input image on the basis of the depth-adjustment-quantity definition function, and spatial frequencies $f_s$ of the input image are controlled to satisfy the adjustment quantity ΔI of the input value I. The adjustment quantity ΔI set for the input value I as an adjustment quantity ΔI corresponding to a depth adjustment quantity ΔD is determined on the basis of an evaluation function evaluating the visual-sense characteristic of a human being for every spatial frequency $f_s$ of the image pattern. In addition, a weight determined in advance can be set for every spatial frequency $f_s$. Thus, by adjusting the spatial frequency $f_s$ serving as a parameter of the single-eye 3D information on the basis of the visual-sense characteristic of a human being, it is possible to present a 3D image more hardly causing the human being to have a feeling of discomfort and a feeling of displeasure.

[Typical Setting of the Weight Function $F(f_s)$]

In the embodiment described above, the weight set for every spatial frequency $f_s$, that is, the weight function $F(f_s)$ representing gain weights to be assigned to spatial frequencies $f_s$, is a typical example of a function emphasizing a low-frequency side or a high-frequency side like the one explained by referring to FIGS. 7A and 7B.

Other typical techniques for settings the weight function $F(f_s)$ are explained by referring to FIGS. 10 to 12 as follows.

Figure 10:
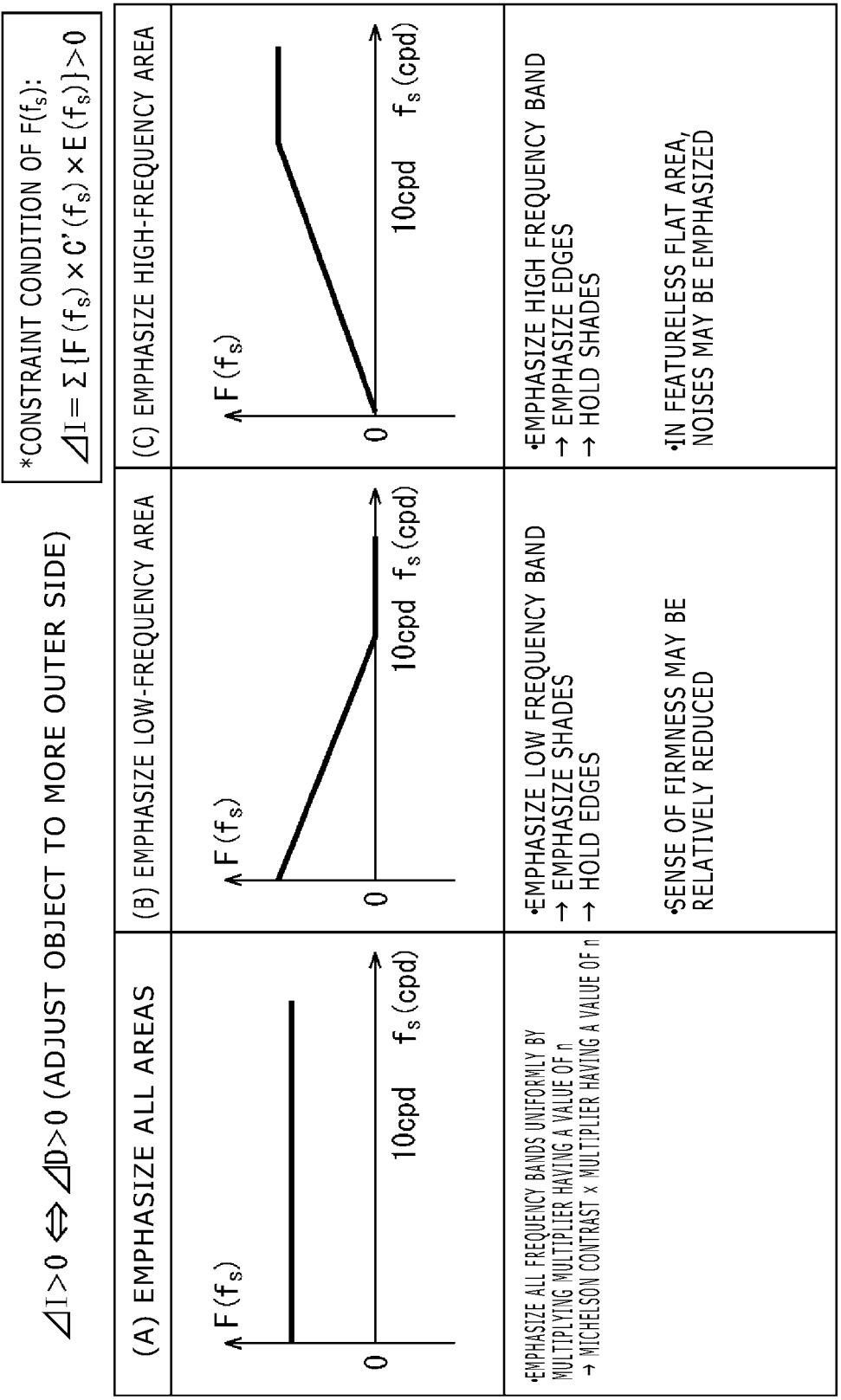
FIG. 10 is a plurality of diagrams showing a typical weight function.

FIG. 10 is a plurality of diagrams referred to in the following description of another typical technique for setting the weight function $F(f_s)$ for ($\Delta D>0 \Leftrightarrow \Delta I>0$), that is, for a case in which the depth adjustment quantity $\Delta D$ and the adjustment quantity $\Delta I$ of the input value I are both positive.

That is to say, FIG. 10 is a plurality of diagrams referred to in the following description of other typical techniques for setting three weight functions $F(f_s)$. To be more specific, (A) of FIG. 10 is a diagram referred to in the following description of a typical technique for setting a weight function $F(f_s)$ for emphasizing all the spatial-frequency bands uniformly by multiplying a multiplier having a value of n. (B) of FIG. 10 is a diagram referred to in the following description of a typical technique for setting a weight function $F(f_s)$ for emphasizing a band of low spatial frequencies. (C) of FIG. 10 is a diagram referred to in the following description of a typical technique for setting a weight function $F(f_s)$ for emphasizing a band of high spatial frequencies.

In the case of the typical technique shown in (A) of FIG. 10 as a typical technique for setting a weight function $F(f_s)$ for emphasizing all the spatial-frequency bands uniformly by multiplying a multiplier having a value of n, the Michelson contrast defined by Eq. (18) given below is emphasized by multiplying a multiplier having a value of n.

$$\text{Michelson Contrast} = \frac{L_{max} - L_{min}}{L_{max} + L_{min}} \quad (18)$$

In Eq. (18) given above, notation $L_{max}$ denotes the maximum of luminance values in a processing-unit area of the 3D image whereas notation $L_{min}$ denotes the minimum of luminance values in the processing-unit area of the 3D image. The size of the processing-unit area is properly set at an optimum value from a viewing-angle function and a pixel-count function.

In the case of the typical technique shown in (B) of FIG. 10 as a typical technique for setting a weight function $F(f_s)$ for emphasizing a band of low spatial frequencies, processing is carried out to emphasize shades of the 3D image and hold edges of the 3D image so that, in some cases, the sense of firmness may be relatively reduced.

In the case of the typical technique shown in (C) of FIG. 10 as a typical technique for setting a weight function $F(f_s)$ for emphasizing a band of high spatial frequencies, processing is carried out to emphasize edges of the 3D image and hold shades of the 3D image so that, in a featureless flat area where luminance values of about the same order line up, noises may be emphasized in some cases.

Figure 11:
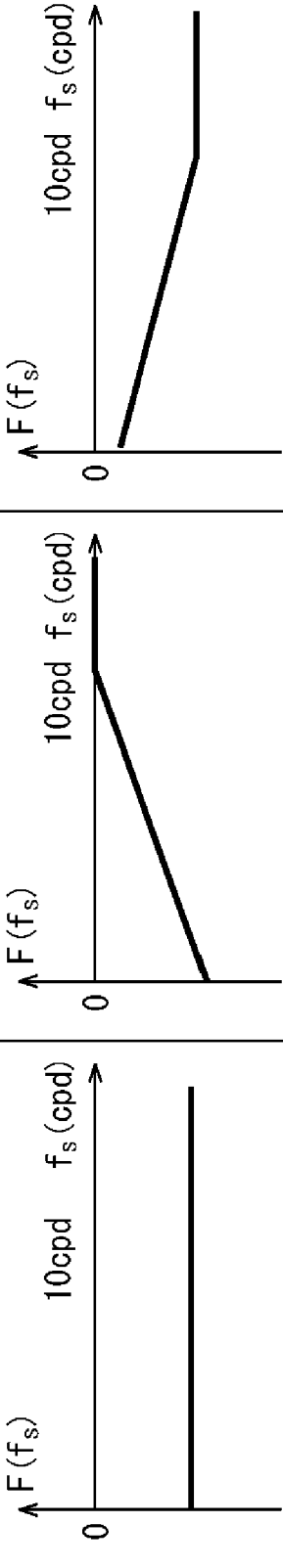
FIG. 11 is a plurality of diagrams showing another typical weight function.

FIG. 11 is a plurality of diagrams referred to in the following description of another typical technique for setting the weight function $F(f_s)$ for ($\Delta D<0 \Leftrightarrow \Delta I<0$), that is, for a case in which the depth adjustment quantity $\Delta D$ and the adjustment quantity $\Delta I$ of the input value I are both negative.

That is to say, FIG. 11 is a plurality of diagrams referred to in the following description of other typical techniques for setting three weight functions $F(f_s)$. To be more specific, (A) of FIG. 11 is a diagram referred to in the following description of a typical technique for setting a weight function $F(f_s)$ for deemphasizing all the spatial-frequency bands uniformly by multiplying a multiplier having a value of n. (B) of FIG. 11 is a diagram referred to in the following description of a typical technique for setting a weight function $F(f_s)$ for deemphasizing a band of low spatial frequencies. (C) of FIG. 11 is a diagram referred to in the following description of a typical technique for setting a weight function $F(f_s)$ for deemphasizing a band of high spatial frequencies.

In the case of the typical technique shown in (A) of FIG. 11 as a typical technique for setting a weight function $F(f_s)$ for deemphasizing all the spatial-frequency bands uniformly by multiplying a multiplier having a value of n, the Michelson contrast is reduced by multiplying a multiplier having a value of n.

In the case of the typical technique shown in (B) of FIG. 11 as a typical technique for setting a weight function $F(f_s)$ for deemphasizing a band of low spatial frequencies, processing is carried out to hold edges of the 3D image and reduce shades of the 3D image so that, if too many high-frequency components are left, the texture impression may change in some cases.

In the case of the typical technique shown in (C) of FIG. 11 as a typical technique for setting a weight function $F(f_s)$ for deemphasizing a band of low spatial frequencies, processing is carried out to hold shades of the 3D image and reduce edges of the 3D image so that impression like blurring of more than that of all the spatial-frequency bands shown in (A) of FIG. 11 may be given.

The typical weight function $F(f_s)$ shown in each of FIGS. 7A, 7B, 10 and 11 is set entirely in an area on the positive or negative side. However, the weight function $F(f_s)$ does not have to be a function set entirely in an area on the positive or negative side. That is to say, the weight function $F(f_s)$ can be any function as long as the constraint condition for the adjustment quantity $\Delta I$ of the input value I is satisfied.

Figure 12:
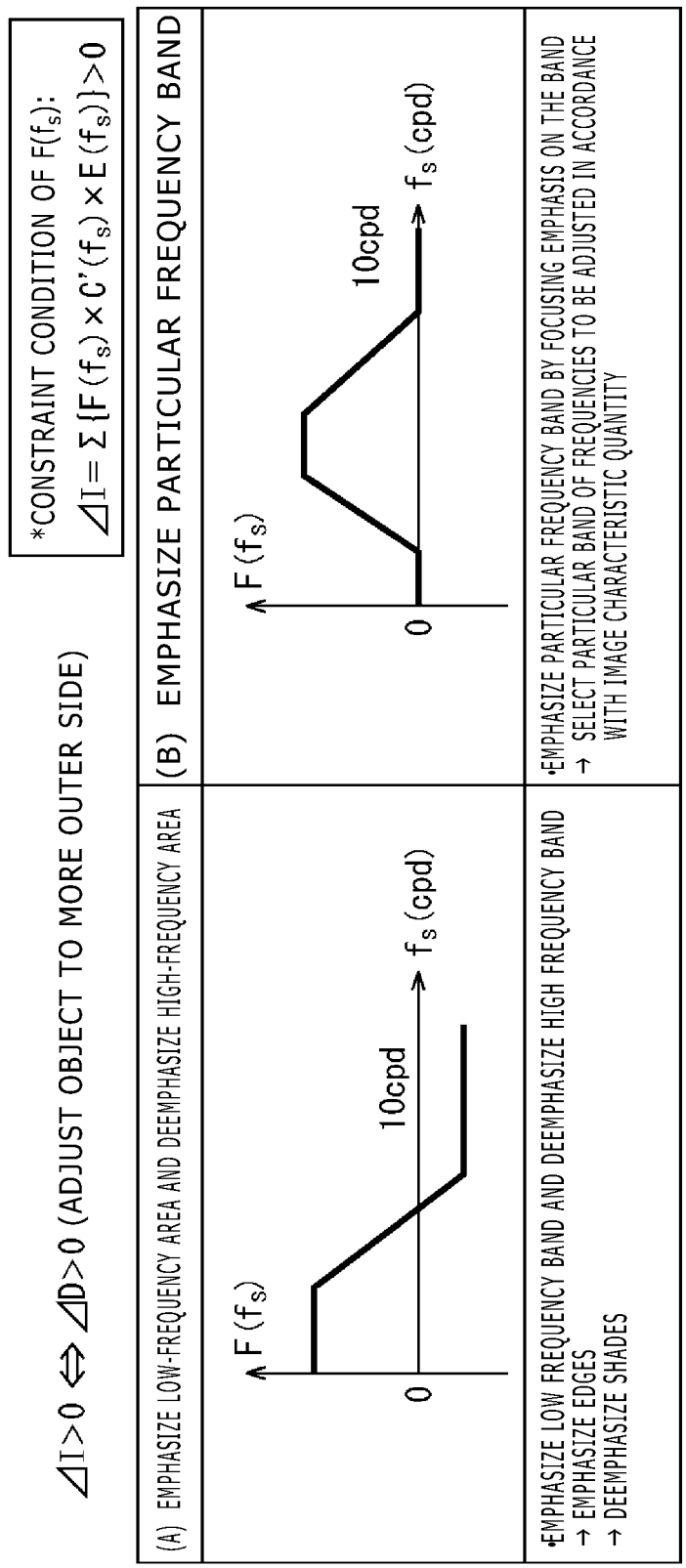
FIG. 12 is a plurality of diagrams showing a further typical weight function.

FIG. 12 is a plurality of diagrams referred in the following description of further typical setting of a weight function $F(f_s)$ for a case in which an object on the image is adjusted to a position on a more outer side.

In order to adjust an object on the image to a position on a more outer side, the weight functions $F(f_s)$ such as the ones shown in FIG. 12 can be set if the constraint condition of ($\Delta I>0$) is required, that is, if the constraint condition requiring that the adjustment quantity $\Delta I$ of the input value I be positive is satisfied.

To be more specific, (A) of FIG. 12 is a diagram referred in the following description of typical setting of a weight function $F(f_s)$ for a case in which a band of low spatial frequencies is emphasized whereas a band of high spatial frequencies is deemphasized. On the other hand, (B) of FIG. 12 is a diagram referred in the following description of typical setting of a weight function $F(f_s)$ for a case in which a particular band of spatial frequencies is emphasized by focusing the emphasis on the particular band.

In the case of the typical technique shown in (A) of FIG. 12 as a typical technique for setting a weight function $F(f_s)$ for emphasizing a band of low spatial frequencies and deemphasizing a band of high spatial frequencies, processing is carried out to emphasize edges of the 3D image and deemphasize shades of the 3D image.

In processing carried out by adopting the typical technique shown in (B) of FIG. 12 as a typical technique for setting a weight function $F(f_s)$ for emphasizing a particular band of spatial frequencies by focusing the emphasis on the particular band, on the other hand, the particular band of spatial frequencies to be adjusted is selected in accordance with an image characteristic quantity.

Also in order to adjust an object on the image to a position on a more inner side, the weight functions $F(f_s)$ such as the ones shown in FIG. 12 can be set if the constraint condition of ($\Delta I < 0$) is required, that is, if the constraint condition requiring that the adjustment quantity $\Delta I$ of the input value I be negative is satisfied. That is to say, as shown in none of the figures, it is possible to set weight functions $F(f_s)$ such as a weight function $F(f_s)$ for deemphasizing a band of low spatial frequencies, a weight function $F(f_s)$ for emphasizing a band of high spatial frequencies and a weight function $F(f_s)$ for deemphasizing a particular band of spatial frequencies by focusing the de-emphasis on the particular band.

[Other Typical Depth Efficiencies]

In the embodiment described above, as indicated by Eq. (2), the input value I of the evaluation function is a sum of products each obtained as a result of multiplying the contrast $C(f_s)$ of a spatial frequency $f_s$ by the depth efficiency $E(f_s)$ of the spatial frequency $f_s$.

Instead of making use of only the depth efficiency $E(f_s)$ of the spatial frequency $f_s$ as indicated by Eq. (2), however, as another typical operation to find the input value I of the evaluation function, the input value I can also be computed by taking the depth efficiency $E(f_t)$ of a time frequency $f_t$ into consideration as well.

Eq. (19) given below is an equation used for computing the input value I by considering not only the depth efficiency $E(f_s)$ of the spatial frequency $f_s$, but also the depth efficiency $E(f_t)$ of the time frequency $f_t$. On the other hand, Eq. (20) given below is an equation expressing a depth efficiency $E(f_s, f_t)$ of the spatial frequency $f_s$ and the time frequency $f_t$.

$$I = \sum_{f_s, f_t} \{C(f_s) \cdot E(f_s, f_t)\} \tag{19}$$

$$E(f_s, f_t) = \exp\left(-\frac{(\log_{10}(f_s) + f_{s0})^2}{2\sigma_s^2}\right) \cdot \exp\left(-\frac{(\log_{10}(f_t) + f_{t0})^2}{2\sigma_t^2}\right) \tag{20}$$

In Eq. (20) given above, notations fs0, σs, ft0 and σt denote quantities set as follows $f_{s0} = 0.4987$
$\sigma_s = 0.8406$
$f_{t0} = -0.7492$
$\sigma_t = 0.5532$ As is obvious from Eq. (20), the depth efficiency $E(f_s, f_t)$ is expressed by the product of the depth efficiency $E(f_s)$ for the spatial frequency $f_s$ and the depth efficiency $E(f_t)$ for the time frequency $f_t$.

Figure 13:
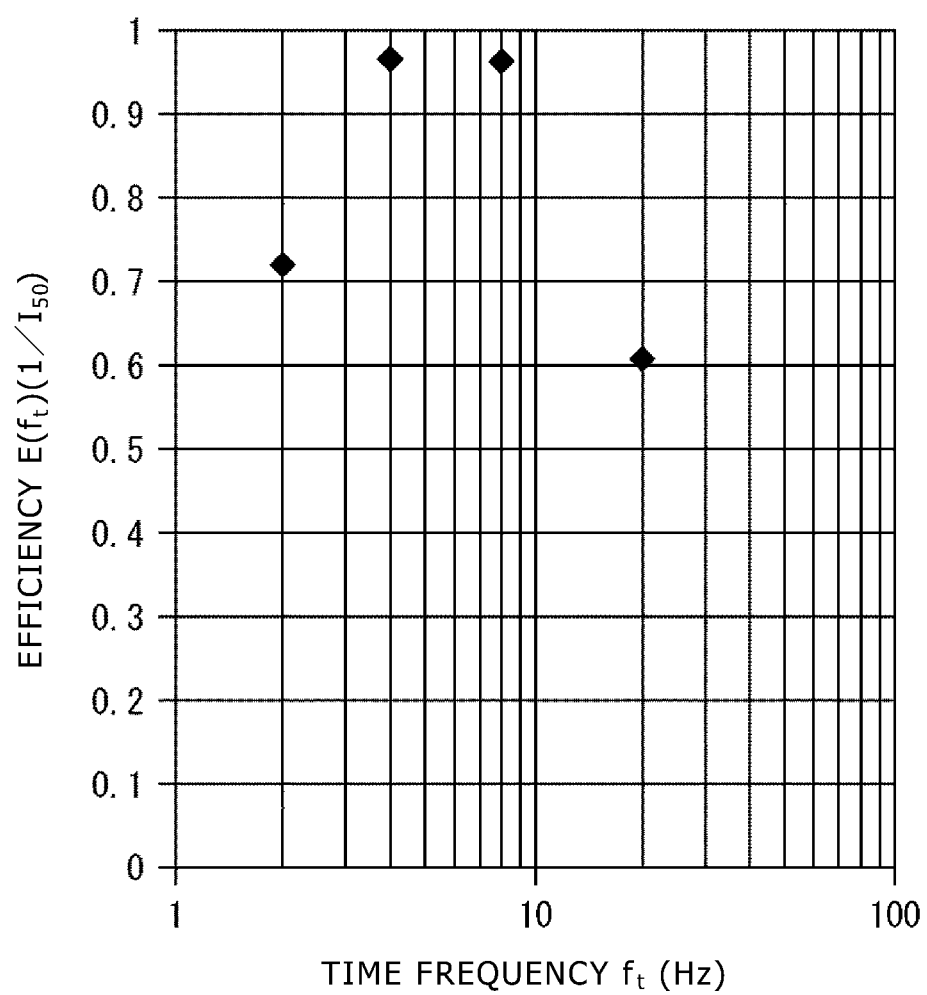
FIG. 13 is a diagram showing a relation between a time frequency and a depth efficiency.

FIG. 13 is a diagram showing a relation between the time frequency $f_t$ and the depth efficiency $E(f_t)$ for the time frequency $f_t$ as a relation corresponding to the Gauss approximation expressing the relation between the spatial frequency $f_s$ and the depth efficiency $E(f_s)$ for the spatial frequency $f_s$.

2. Second Embodiment

[Typical Configuration of the Image Processing Apparatus]

Figure 14:
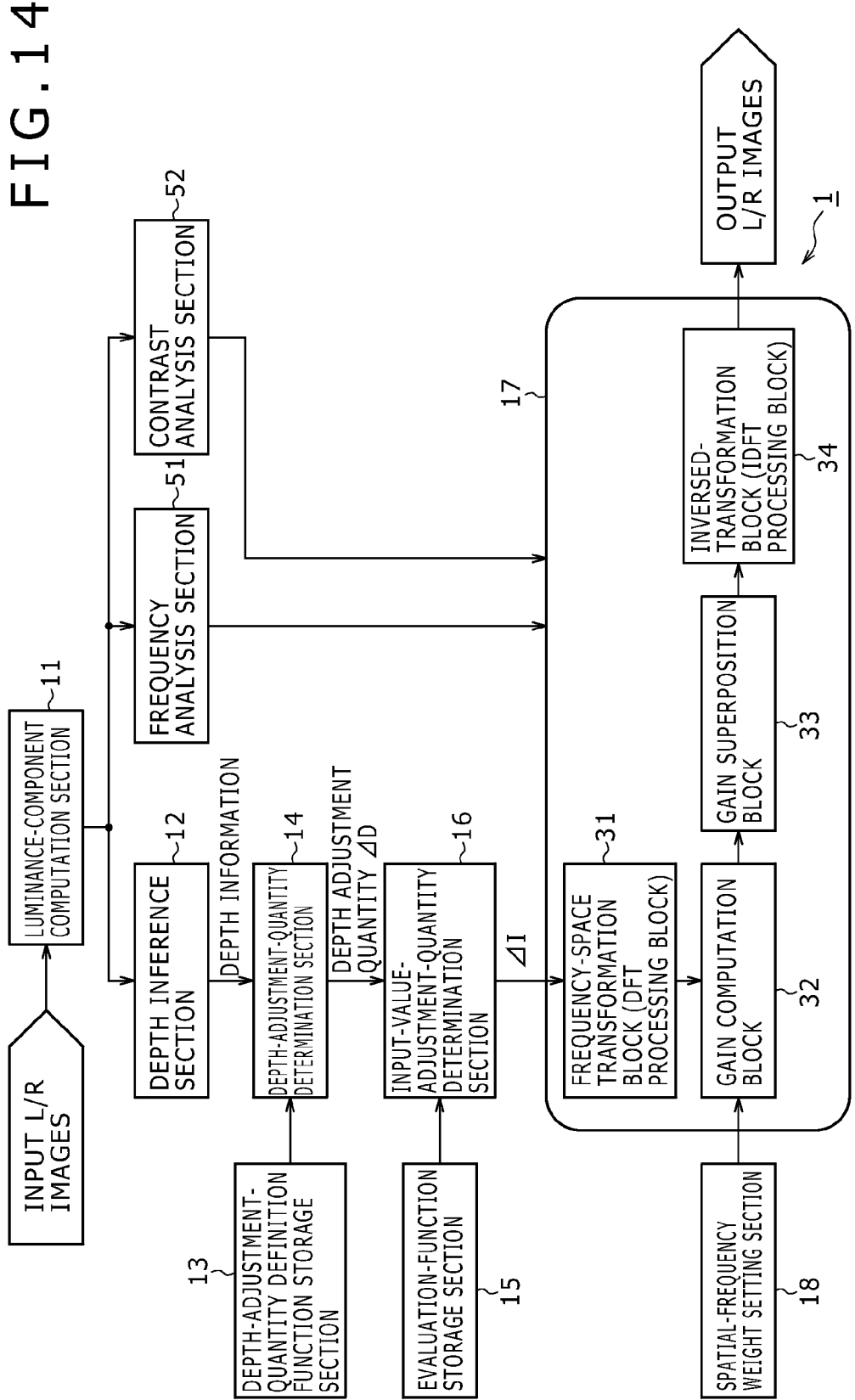
FIG. 14 is a block diagram showing a typical configuration of an image processing apparatus according to a second embodiment of the present application.

FIG. 14 is a block diagram showing a typical configuration of an image processing apparatus according to a second embodiment of the present application.

The second embodiment shown in FIG. 14 is different from the first embodiment explained above in that the second embodiment is newly provided with a frequency analysis section 51 and a contrast analysis section 52.

The frequency analysis section 51 analyzes spatial-frequency components of the 3D image. The spatial-frequency components of the 3D image can be analyzed by adoption of a technique making use of typically the Gabor filter. The Gabor filter can be said to be a filter approximating a signal response characteristic in the visual-perception system. The function g(x, y, λ, θ, ψ, σ, γ) of the Gabor filter can be expressed by Eq. (21) as follows:

$$g(x, y, \lambda, \theta, \psi, \sigma, \gamma) = \exp\left(-\frac{(x\cos\theta + y\sin\theta)^2 + \gamma^2(-x\sin\theta + y\cos\theta)^2}{2\sigma^2}\right) \cos\left(2\pi\frac{x\cos\theta + y\sin\theta}{\lambda} + \psi\right) \tag{21}$$

In Eq. (21) given above, notations x and y denote coordinate values of the luminance image, notation λ denotes the wavelength for the spatial frequency fs, notation θ denotes the azimuth direction, notation ψ denotes the phase, notation σ denotes the dispersion of the Gaussian distribution and notation γ denotes the aspect ratio.

For example, the frequency analysis section 51 is capable of extracting an area having a spatial-frequency component of 1 cpd from a luminance image by convolving the Gabor-filter function g(x, y, λ, θ, ψ, σ, γ) expressed by Eq. (21) and a luminance value computed by the luminance-component computation section 11 as the luminance value of the luminance image. In Eq. (21), the wavelength λ is a wavelength corresponding to a spatial frequency of 1 cpd. Also in order to extract an area having another spatial-frequency component from a luminance image, in the same way, the wavelength λ is properly set and the frequency analysis section 51 is then capable of extracting the area from the luminance image by convolving the Gabor-filter function g(x, y, λ, θ, ψ, σ, γ) and the luminance value of the luminance image. For example, the wavelength λ is set at five different values such as values corresponding to spatial frequencies of 0.5 cpd, 1 cpd, 2 cpd, 4 cpd and 8 cpd respectively in order to analyze the spatial-frequency components. Of course, any further spatial-frequency component can be analyzed by setting the wavelength λ at a value corresponding to the spatial-frequency component.

By convolving the Gabor-filter function g(x, y, λ, θ, ψ, σ, γ) expressed by Eq. (21), in which the wavelength λ is a wavelength corresponding to a spatial frequency determined in advance, and a luminance value computed by the luminance-component computation section 11 as the luminance value of the luminance image as described above, it is possible to know what areas are included in the luminance image and what spatial-frequency components are included in each of the areas.

The contrast analysis section 52 extracts a contrast component of the 3D image by making use of a luminance component computed by the luminance-component computation section 11 as the luminance component of the 3D image. To put it concretely, the contrast analysis section 52 determines typically an area of M×N pixels cited before as a processing-unit area which is the unit of processing carried out to extract a contrast component. Then, the contrast analysis section 52 computes the Michelson contrast expressed by Eq. (18) for the determined processing-unit area. Some of the determined processing-unit areas may overlap each other. As an alternative, processing-unit areas may be determined to form a tile shape so that none of the determined processing-unit areas overlap each other. In addition, in order to attach a high value to the precision, the processing-unit areas may be shifted from each other by one pixel unit.

The characteristic (or the distribution) of the spatial-frequency components analyzed by the frequency analysis section 51 and the characteristic (or the distribution) of the contrast components analyzed by the contrast analysis section 52 are supplied to the depth control section 17. By making use of these characteristics, the depth control section 17 is capable of determining a gain weight for every spatial frequency $f_s$. That is to say, the depth control section 17 is capable of determining a weight function $F(f_s)$ representing gain weights each to be assigned to one of the spatial frequencies $f_s$ on the basis of the characteristics received from the frequency analysis section 51 and the contrast analysis section 52.

The series of processes described previously can be carried out by hardware and/or execution of software. If the series of processes described above is carried out by execution of software, programs composing the software can be installed into a computer which can be a special-purpose computer embedded in dedicated hardware, a general-purpose personal computer or the like. A general-purpose personal computer is a personal computer, which can be made capable of carrying out a variety of functions by installing a variety of programs into the personal computer.

FIG. 15 is a block diagram showing a typical configuration of hardware composing the computer for executing programs in order to carry out the series of processes described previously.

As shown in the figure, the computer employs a CPU (Central Processing Unit) 101, a ROM (Read Only Memory) 102 and a RAM (Random Access Memory) 103. The CPU 101, the ROM 102 and the RAM 103 are connected to each other by a bus 104.

The bus 104 is also connected to an input/output interface 105. The input/output interface 105 is connected to an input section 106, an output section 107, a storage section 108, a communication section 109 and a drive 110.

The input section 106 includes a keyboard, a mouse and a microphone whereas the output section 107 includes a display unit and a speaker. The storage section 108 includes a hard disk and/or a nonvolatile memory. The communication section 109 has a network interface. The drive 110 drives a removable recording medium 111 cited above. The removable recording medium 111 can be a magnetic disk, an optical disk, a magneto-optical disk or a semiconductor memory.

In the computer having the configuration described above, the CPU 101 loads a program typically stored in the storage section 108 into the RAM 103 by way of the input/output interface 105 and the bus 104, executing the program in order to carry out the series of processes described above.

When the removable recording medium 111 is mounted on the drive 110, the computer is capable of installing a program recorded on the removable recording medium 111 into the storage section 108 by way of the input/output interface 105. As an alternative, a program can also be downloaded from a program provider through a wire or radio transmission medium into the storage section 108 and installed into the storage section 108 by way of the communication section 109. Typical examples of the transmission medium are a local-area network, the Internet and digital satellite broadcasting. As another alternative, a program can also be stored in advance in the ROM 102 or the storage section 108.

It is also worth noting that, in this specification, steps of the flowchart described above can be carried out not only in a pre-prescribed order along the time axis, but also concurrently or individually. That is to say, instead of carrying out the steps of the flowchart in the order prescribed in advance along the time axis, the steps can also be executed in parallel or with necessary different timings such as times at which the steps are invoked.

In addition, configurations of the present application are by no means limited to the embodiments described above. That is to say, a variety of changes can be made to the embodiments as far as they are within the scope of the present application.

It is to be noted that the present application can also be realized into implementations described as follows:

1. An image processing apparatus including:
a depth-adjustment-quantity determination section configured to determine a depth adjustment quantity of an input 3D image;
an evaluation-function storage section configured to store an evaluation function representing a relation between an input value and a subjective depth quantity defined as a depth quantity subjectively felt by the user where the input value is the sum of N products each obtained as a result of multiplying the contrast of each individual one of spatial-frequency components included in the input 3D image by a weight assigned to the individual spatial-frequency component for a case in which the spatial-frequency components included in the entire input 3D image are classified into N spatial-frequency components;
an input-value-adjustment-quantity determination section configured to determine an adjustment quantity of the input value on the basis of the evaluation function to serve as an adjustment quantity corresponding to the depth adjustment quantity determined by the depth-adjustment-quantity determination section;
an adjustment-gain computation block configured to compute a gain value of each of the spatial-frequency components on the basis of the adjustment quantity determined by the input-value-adjustment-quantity determination section to serve as the adjustment quantity of the input value; and
an image adjustment block configured to adjust the spatial-frequency components of the input 3D image in accordance with the gain values computed by the adjustment-gain computation block for the spatial-frequency components respectively.

2. The image processing apparatus according to implementation 1, the image processing apparatus further having:
a frequency-space transformation block configured to transform the input 3D image into a frequency space; and
an image-space inversed-transformation block configured to inversely transform the 3D image transformed into the frequency space back into an image space, wherein
the adjustment-gain computation block computes a gain value of each of the spatial-frequency components as a gain value satisfying the adjustment quantity determined by the input-value-adjustment-quantity determination section to serve as the adjustment quantity of the input value,
the image adjustment block adjusts the spatial-frequency components of the input 3D image by superposing the gain values computed by the adjustment-gain computation block as the gain values of the spatial-frequency components on coefficients obtained by transformation carried out by the frequency-space transformation block to transform the input 3D image into the frequency space, and
the image-space inversed-transformation block inversely transforms the coefficients superposed with the gain values of the spatial-frequency components computed by the adjustment-gain computation block into the image space.

3. The image processing apparatus according to implementation 2 wherein the frequency-space transformation block transforms the input 3D image into the frequency space by carrying out a Fourier transformation.

4. The image processing apparatus according to any one of implementations 1 to 3, the image processing apparatus further having a spatial-frequency weight setting section configured to set a function representing gain weights to be assigned to the spatial-frequency components, wherein the adjustment-gain computation block computes a gain value of each of the spatial-frequency components on the basis of the function.

5. The image processing apparatus according to any one of implementations 1 to 4 wherein:

if the depth adjustment quantity is positive, the adjustment quantity determined by the input-value-adjustment-quantity determination section to serve as the adjustment quantity of the input value is also positive; and if the depth adjustment quantity is negative, the adjustment quantity determined by the input-value-adjustment-quantity determination section to serve as the adjustment quantity of the input value is also negative.

6. The image processing apparatus according to any one of implementations 1 to 5, the image processing apparatus further having:

a depth-information inference section configured to infer depth information from the input 3D; and a depth-adjustment-quantity definition function storage section configured to store a depth-adjustment-quantity definition function defining the depth adjustment quantities for the depth information, wherein the depth-adjustment-quantity determination section determines the depth adjustment quantity from the depth information inferred by the depth-information inference section on the basis of the depth-adjustment-quantity definition function.

7. An image processing method including:

determining a depth adjustment quantity of an input 3D image;

determining an adjustment quantity of an input value to serve as an adjustment quantity corresponding to the determined depth adjustment quantity on the basis of an evaluation function representing a relation between the input value and a subjective depth quantity defined as a depth quantity subjectively felt by the user where the input value is the sum of N products each obtained as a result of multiplying the contrast of each individual one of spatial-frequency components included in the input 3D image by a weight assigned to the individual spatial-frequency component for a case in which the spatial-frequency components included in the entire input 3D image are classified into N spatial-frequency components;

computing a gain value of each of the spatial-frequency components on the basis of the determined adjustment quantity of the input value; and adjusting the spatial-frequency components of the input 3D image in accordance with the gain values computed for the spatial-frequency components respectively.

8. An image processing program to be executed by a computer to carry out processing including:

determining a depth adjustment quantity of an input 3D image;

determining an adjustment quantity of an input value to serve as an adjustment quantity corresponding to the determined depth adjustment quantity on the basis of an evaluation function representing a relation between the input value and a subjective depth quantity defined as a depth quantity subjectively felt by the user where the input value is the sum of N products each obtained as a result of multiplying the contrast of each individual one of spatial-frequency components included in the input 3D image by a weight assigned to the individual spatial-frequency component for a case in which the spatial-frequency components included in the entire input 3D image are classified into N spatial-frequency components;

computing a gain value of each of the spatial-frequency components on the basis of the determined adjustment quantity of the input value; and adjusting the spatial-frequency components of the input 3D image in accordance with the gain values computed for the spatial-frequency components respectively.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus comprising:

a processor; and memory, wherein one or more sections and blocks are stored in the memory and executed by the processor, the one or more sections and blocks including:

a depth-adjustment-quantity determination section configured to determine a depth adjustment quantity of an input three-dimensional image;

an evaluation-function storage section configured to store an evaluation function representing a relation between an input value and a subjective depth quantity, wherein said input value is the sum of N products each obtained as a result of multiplying the contrast of each individual one of spatial-frequency components included in said input three-dimensional image by a weight assigned to said individual spatial-frequency component for a case in which said spatial-frequency components included in said entire input three-dimensional image are classified into N spatial-frequency components, wherein N is a variable integer greater than zero;

an input-value-adjustment-quantity determination section configured to determine an adjustment quantity of said input value on the basis of said evaluation function to serve as an adjustment quantity corresponding to said depth adjustment quantity determined by said depth-adjustment-quantity determination section;

an adjustment-gain computation block configured to compute a gain value of each of said spatial-frequency components on the basis of said adjustment quantity determined by said input-value-adjustment-quantity determination section to serve as said adjustment quantity of said input value; and an image adjustment block configured to adjust said spatial-frequency components of said input three-dimensional image in accordance with said gain values computed by said adjustment-gain computation block for said spatial-frequency components respectively.

2. The image processing apparatus according to claim 1, said image processing apparatus further comprising:

a frequency-space transformation block configured to transform said input three-dimensional image into a frequency space; and an image-space inversed-transformation block configured to inversely transform said three-dimensional image transformed into said frequency space back into an image space, wherein said adjustment-gain computation block computes a gain value of each of said spatial-frequency components as a gain value satisfying said adjustment quantity determined by said input-value-adjustment-quantity determination section to serve as said adjustment quantity of said input value, said image adjustment block adjusts said spatial-frequency components of said input three-dimensional image by superposing said gain values computed by said adjustment-gain computation block as said gain values of said spatial-frequency components on coefficients obtained by the transformation carried out by said frequency-space transformation block to transform said input three-dimensional image into said frequency space, and said image-space inversed-transformation block inversely transforms said coefficients superposed with said gain values of said spatial-frequency components into said image space.

3. The image processing apparatus according to claim 2, wherein said frequency-space transformation block transforms said input three-dimensional image into said frequency space by carrying out a Fourier transformation.

4. The image processing apparatus according to claim 1, said image processing apparatus further comprising;
   a spatial-frequency weight setting section configured to set a function representing gain weights to be assigned to said spatial-frequency components,
   wherein said adjustment-gain computation block computes a gain value of each of said spatial-frequency components on the basis of said function.

5. The image processing apparatus according to claim 1 wherein:
   if said depth adjustment quantity is positive, said adjustment quantity determined by said input-value-adjustment-quantity determination section to serve as said adjustment quantity of said input value is also positive; and
   if said depth adjustment quantity is negative, said adjustment quantity determined by said input-value-adjustment-quantity determination section to serve as said adjustment quantity of said input value is also negative.

6. The image processing apparatus according to claim 1, said image processing apparatus further comprising:
   a depth-information inference section configured to infer depth information from said input three-dimensional image; and
   a depth-adjustment-quantity definition function storage section configured to store a depth-adjustment-quantity definition function defining said depth adjustment quantities for said depth information,
   wherein said depth-adjustment-quantity determination section determines said depth adjustment quantity from said depth information inferred by said depth-information inference section on the basis of said depth-adjustment-quantity definition function.

7. An image processing method for adjusting a depth of a three-dimensional image, the method comprising:
   determining, by a processor, a depth adjustment quantity of an input three-dimensional image;
   determining an adjustment quantity of an input value to serve as an adjustment quantity corresponding to said determined depth adjustment quantity on the basis of an evaluation function representing a relation between said input value and a subjective depth quantity, wherein said input value is the sum of N products each obtained as a result of multiplying the contrast of each individual one of spatial-frequency components included in said input three-dimensional image by a weight assigned to said individual spatial-frequency component for a case in which said spatial-frequency components included in said entire input three-dimensional image are classified into N spatial-frequency components, wherein N is a variable integer greater than zero;
   computing a gain value of each of said spatial-frequency components on the basis of said determined adjustment quantity of said input value; and
   adjusting said spatial-frequency components of said input three-dimensional image in accordance with said gain values computed for said spatial-frequency components respectively.

8. A non-transitory computer readable medium having stored thereon an image processing program that causes a computing system to execute a method, the method comprising:
   determining a depth adjustment quantity of an input three-dimensional image;
   determining an adjustment quantity of an input value to serve as an adjustment quantity corresponding to said determined depth adjustment quantity on the basis of an evaluation function representing a relation between said input value and a subjective depth quantity, wherein said input value is the sum of N products each obtained as a result of multiplying the contrast of each individual one of spatial-frequency components included in said input three-dimensional image by a weight assigned to said individual spatial-frequency component for a case in which said spatial-frequency components included in said entire input three-dimensional image are classified into N spatial-frequency components, wherein N is a variable integer greater than zero;
   computing a gain value of each of said spatial-frequency components on the basis of said determined adjustment quantity of said input value; and
   adjusting said spatial-frequency components of said input three-dimensional image in accordance with said gain values computed for said spatial-frequency components respectively.

9. The image processing method according to claim 7, further comprising:
   transforming said input three-dimensional image into a frequency space; and
   inversely transforming said three-dimensional image transformed into said frequency space back into an image space, the method further comprising:
      computing a gain value of each of said spatial-frequency components as a gain value satisfying said determined adjustment quantity to serve as said adjustment quantity of said input value,
      adjusting said spatial-frequency components of said input three-dimensional image by superposing said computed gain values as said gain values of said spatial-frequency components on coefficients obtained by the transformation of said input three-dimensional image into said frequency space, and
      inversely transforming said coefficients superposed with said gain values of said spatial-frequency components into said image space.

10. The image processing method according to claim 9, further comprising transforming said input three-dimensional image into said frequency space by carrying out a Fourier transformation.

11. The image processing method according to claim 7, further comprising:
   determining a function representing gain weights to be assigned to said spatial-frequency components; and
   computing a gain value of each of said spatial-frequency components on the basis of said function.

12. The image processing method according to claim 7, wherein:

if said depth adjustment quantity is positive, said determined adjustment quantity is also positive; and if said depth adjustment quantity is negative, said determined adjustment quantity is also negative.

13. The image processing method according to claim 7, the method further comprising:

inferring a depth information from said input three-dimensional image; and storing a depth-adjustment-quantity definition function defining said depth adjustment quantities for said depth information, wherein said depth adjustment quantity is determined from said depth information inferred on the basis of said depth-adjustment-quantity definition function.

14. The non-transitory computer readable medium according to claim 8, wherein the method further comprises:

transforming said input three-dimensional image into a frequency space; and inversely transforming said three-dimensional image transformed into said frequency space back into an image space, the method further comprising:

computing a gain value of each of said spatial-frequency components as a gain value satisfying said determined adjustment quantity to serve as said adjustment quantity of said input value, adjusting said spatial-frequency components of said input three-dimensional image by superposing said computed gain values as said gain values of said spatial-frequency components on coefficients obtained by the transformation of said input three-dimensional image into said frequency space, and inversely transforming said coefficients superposed with said gain values of said spatial-frequency components into said image space.

15. The non-transitory computer readable medium according to claim 14, the method further comprising transforming said input three-dimensional image into said frequency space by carrying out a Fourier transformation.

16. The non-transitory computer readable medium according to claim 8, the method further comprising:

determining a function representing gain weights to be assigned to said spatial-frequency components; and computing a gain value of each of said spatial-frequency components on the basis of said function.

17. The non-transitory computer readable medium according to claim 8, wherein:

if said depth adjustment quantity is positive, said determined adjustment quantity is also positive; and if said depth adjustment quantity is negative, said determined adjustment quantity is also negative.

18. The non-transitory computer readable medium according to claim 8, the method further comprising:

inferring a depth information from said input three-dimensional image; and storing a depth-adjustment-quantity definition function defining said depth adjustment quantities for said depth information, wherein said depth adjustment quantity is determined from said depth information inferred on the basis of said depth-adjustment-quantity definition function.

* * * * *